United States Patent
Noguchi et al.

(10) Patent No.: US 8,433,947 B2
(45) Date of Patent: Apr. 30, 2013

(54) COMPUTER PROGRAM, METHOD, AND APPARATUS FOR CONTROLLING DATA ALLOCATION

(75) Inventors: Yasuo Noguchi, Kawasaki (JP); Hideki Sakurai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 12/966,713

(22) Filed: Dec. 13, 2010

(65) Prior Publication Data
US 2011/0191628 A1  Aug. 4, 2011

(30) Foreign Application Priority Data
Dec. 18, 2009  (JP) .................................. 2009-287068

(51) Int. Cl.
*G06F 11/00*  (2006.01)
(52) U.S. Cl.
USPC ........................... 714/6.2; 714/6.23; 714/6.32

(58) Field of Classification Search .................... None
See application file for complete search history.

(56) References Cited

U.S. PATENT DOCUMENTS

| 7,529,965 B2 * | 5/2009 | Ikeuchi et al. ................. 714/6.2 |
| 2005/0235109 A1 | 10/2005 | Ogihara et al. |
| 2009/0113237 A1 * | 4/2009 | Ito et al. ............................ 714/7 |
| 2010/0138691 A1 * | 6/2010 | Kumar et al. ..................... 714/6 |

FOREIGN PATENT DOCUMENTS

| JP | 2005-122338 A | 5/2005 |
| JP | 2005-301594 A | 10/2005 |
| JP | 2006-164304 A | 6/2006 |
| WO | WO-2004/104845 | 12/2004 |

* cited by examiner

*Primary Examiner* — Michael Maskulinski
(74) *Attorney, Agent, or Firm* — Fujitsu Patent Center

(57) ABSTRACT

A computer executes a data allocation control program to control allocation of data in a plurality of disk nodes. A redundancy restoration module executes a redundancy restoration procedure by commanding disk nodes to create a new copy of redundancy-lost data. An error message reception module receives a write error message indicating a write error in a storage device during the redundancy restoration procedure and records an identifier of the faulty storage device in an error record memory. A copy command module identifies accessed data in the faulty storage device and commands a relevant disk node to create a copy of the identified data in the faulty storage device in the case where there is no redundant copy of the data.

9 Claims, 31 Drawing Sheets

FIG. 7

150 METADATA MEMORY

151 METADATA TABLE

| DISK NODE ID | DISK ID | SLICE ID | STATUS | LOGICAL DISK ID | SEGMENT ID | LOGICAL DISK ADDRESS | PAIRED DISK NODE ID | PAIRED DISK ID | PAIRED SLICE ID |
|---|---|---|---|---|---|---|---|---|---|
| DP1 | 1 | 1 | P | LVOL-X | 1 | ADDR1 | DP3 | 1 | 1 |
| DP1 | 1 | 2 | S | LVOL-X | 2 | ADDR2 | DP2 | 1 | 1 |
| ... | ... | ... | ... | ... | ... | ... | ... | ... | ... |

FIG. 8

540 LOGICAL DISK METADATA MEMORY

541 LOGICAL DISK METADATA TABLE

| DISK NODE ID | DISK ID | SLICE ID | STATUS | LOGICAL DISK ID | SEGMENT ID | LOGICAL DISK ADDRESS | PAIRED DISK NODE ID | PAIRED DISK ID | PAIRED SLICE ID |
|---|---|---|---|---|---|---|---|---|---|
| DP1 | 1 | 1 | P | LVOL-X | 1 | ADDR1 | DP3 | 1 | 1 |
| DP1 | 1 | 2 | S | LVOL-X | 2 | ADDR2 | DP2 | 1 | 1 |
| ... | ... | ... | ... | ... | ... | ... | ... | ... | ... |
| DP2 | 1 | 1 | P | LVOL-X | 2 | ADDR2 | DP1 | 1 | 2 |
| DP2 | 1 | 2 | S | LVOL-X | 4 | ADDR4 | DP4 | 1 | 1 |
| DP2 | 1 | 3 | S | LVOL-X | 3 | ADDRn | DP3 | 1 | 3 |
| ... | ... | ... | ... | ... | ... | ... | ... | ... | ... |
| DP3 | 1 | 1 | S | LVOL-X | 1 | ADDR1 | DP1 | 1 | 1 |
| DP3 | 1 | 2 | F | NULL | NULL | NULL | NULL | NULL | NULL |
| DP3 | 1 | 3 | P | LVOL-X | 3 | ADDRn | DP2 | 1 | 3 |
| ... | ... | ... | ... | ... | ... | ... | ... | ... | ... |
| DP4 | 1 | 1 | P | LVOL-X | 4 | ADDR4 | DP2 | 1 | 2 |
| ... | ... | ... | ... | ... | ... | ... | ... | ... | ... |

FIG. 25

| WRITE ERROR (DP1,DP2) | DP1 | DP2 | DP3 | SEQUENCE |
|---|---|---|---|---|
| INITIAL STATE (NO, NO) | P | S | F | |
| (YES, YES) | 1. P→P<br>2. SOURCE<br>3. P→F | 1. S→F | 1. F→R<br>2. DESTINATION<br>3. R→SP | 1. CHANGE METADATA<br>2. COPY SLICE<br>3. CHANGE METADATA |
| (YES, NO) | 1. P→F | 1. S→SP | NO CHANGES | 1. CHANGE METADATA |
| (NO, YES) | 1. P→SP | 1. S→F | NO CHANGES | 1. CHANGE METADATA |

FIG. 27

| WRITE ERROR (DP1,DP2) | DP1 | DP2 | DP3 | SEQUENCE |
|---|---|---|---|---|
| INITIAL STATE (NO, NO) | P | R | F | |
| (YES, YES) | 1. P→P<br>2. SOURCE<br>3. P→F | 1. R→F | 1. F→R<br>2. DESTINATION<br>3. R→SP | 1. CHANGE METADATA<br>2. COPY SLICE<br>3. CHANGE METADATA |
| (YES, NO) | 1. P→P<br>2. SOURCE<br>3. P→F | 1. R→F | 1. F→R<br>2. DESTINATION<br>3. R→SP | 1. CHANGE METADATA<br>2. COPY SLICE<br>3. CHANGE METADATA |
| (NO, YES) | 1. P→SP | 1. R→F | NO CHANGES | 1. CHANGE METADATA |

FIG. 29

| WRITE ERROR (DP1,DP2) | DP1 | DP2 | SEQUENCE |
|---|---|---|---|
| INITIAL STATE (NO, NO) | SP | F | |
| (YES, NO) | 1. SP→P<br>2. SOURCE<br>3. P→F | 1. F→R<br>2. DESTINATION<br>3. R→SP | 1. CHANGE METADATA<br>2. COPY SLICE<br>3. CHANGE METADATA |

COMPUTER PROGRAM, METHOD, AND APPARATUS FOR CONTROLLING DATA ALLOCATION

CROSS-REFERENCE TO RELATED APPLICATION

This application is based upon and claims the benefit of priority of the prior Japanese Patent Application No. 2009-287068, filed on Dec. 18, 2009, the entire contents of which are incorporated herein by reference.

FIELD

The embodiments discussed herein relate to a computer program, method, and apparatus for controlling allocation of data managed in a plurality of disk nodes.

BACKGROUND

Multi-node storage systems are known as a class of data storage systems which employ a plurality of computers to store and manage data in a distributed manner. Specifically, a multi-node storage system is formed from a plurality of disk nodes and a control node which are interconnected by a network. The system provides virtual disks, or logical disks, for access to storage data physically distributed in multiple disk nodes under the control of the control node.

More specifically, a logical disk in a multi-node storage system is divided into a plurality of segments. Disk nodes, on the other hand, have their respective local storage devices, the space of which is divided into a plurality of slices. Here the slice size is equal to the segment size. The control node assigns one slice to each single segment of logical disks and informs client computers, or access nodes, of the resulting associations between the slices and segments. An access node issues a write request for a specific segment by sending write data to a disk node that manages a slice corresponding to the segment. Upon receipt, the disk node stores the received data in a relevant slice of its storage device.

The above-described multi-node storage system is scalable. That is, it is possible to expand the managed data capacity by placing additional disk nodes on the network.

The multi-node storage system may also be configured to allocate a plurality of slices to one segment. In the case of two slices per segment, one slice is designated as a primary slice, and the other slice as a secondary slice. The primary slice is a slice to which the access nodes direct their read and write requests. The secondary slice is where the primary slice is mirrored (i.e., the same write data is written in both slices). Such mirrored slice pairs ensure the redundancy of data in the system.

A disk node may encounter a failure in its storage devices or other problem. Upon detection of such anomalies, a process is invoked to restore the redundancy of stored data. For example, a redundancy restoration process first detaches the failed node from the system. Since some other disk nodes have a copy of the data stored in the failed node, the process then duplicates the copy in different nodes, thus regaining the data redundancy.

Once disconnected from the system, the disk node is no longer accessible to other nodes. For this reason, disconnection of a faulty disk node leads to permanent loss of data if it is unconditionally executed when another storage device is failed during the redundancy restoration process. Suppose, for example, that data has originally been stored in first and second storage devices. When the first storage device fails, the system initiates a redundancy restoration process. If the second storage device fails during the redundancy restoration process, the data will be lost as a result of consequent disconnection of a disk node managing the second storage device.

SUMMARY

According to an aspect of the invention, there is provided a computer-readable, non-transitory medium storing a data allocation control program for controlling data allocation in a plurality of disk nodes that manage data in storage devices connected thereto. The data allocation control program, when executed by a computer, causes the computer to perform a process including the following operations: executing a redundancy restoration process by commanding a first disk node that manages redundancy-lost data to create a new copy of the redundancy-lost data, the redundancy-lost data being data stored in a first storage device and lacking a copy thereof; recording, upon receipt of a write error message indicating a write error encountered by a second storage device during the redundancy restoration process, an identifier of the second storage device in an error record memory; and identifying the second storage device by consulting the error record memory, selecting data stored in the second storage device as copy target data, and commanding a second disk node managing the second storage device to create a copy of the copy target data in a third storage device having no write error when the third storage device has no such copy of the copy target data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example data structure of a metadata memory;

FIG. 8 illustrates an example data structure of a logical disk metadata memory;

FIG. 25 illustrates an example of how the allocation is changed in the case where the segment is allocated primary and secondary slices;

FIG. 27 illustrates an example of how the allocation is changed in the case where the segment is allocated primary and reserved slices;

FIG. 29 illustrates an example of how the allocation is changed in the case where the segment is allocated a single primary slice;

DESCRIPTION OF EMBODIMENTS

Figure 1:
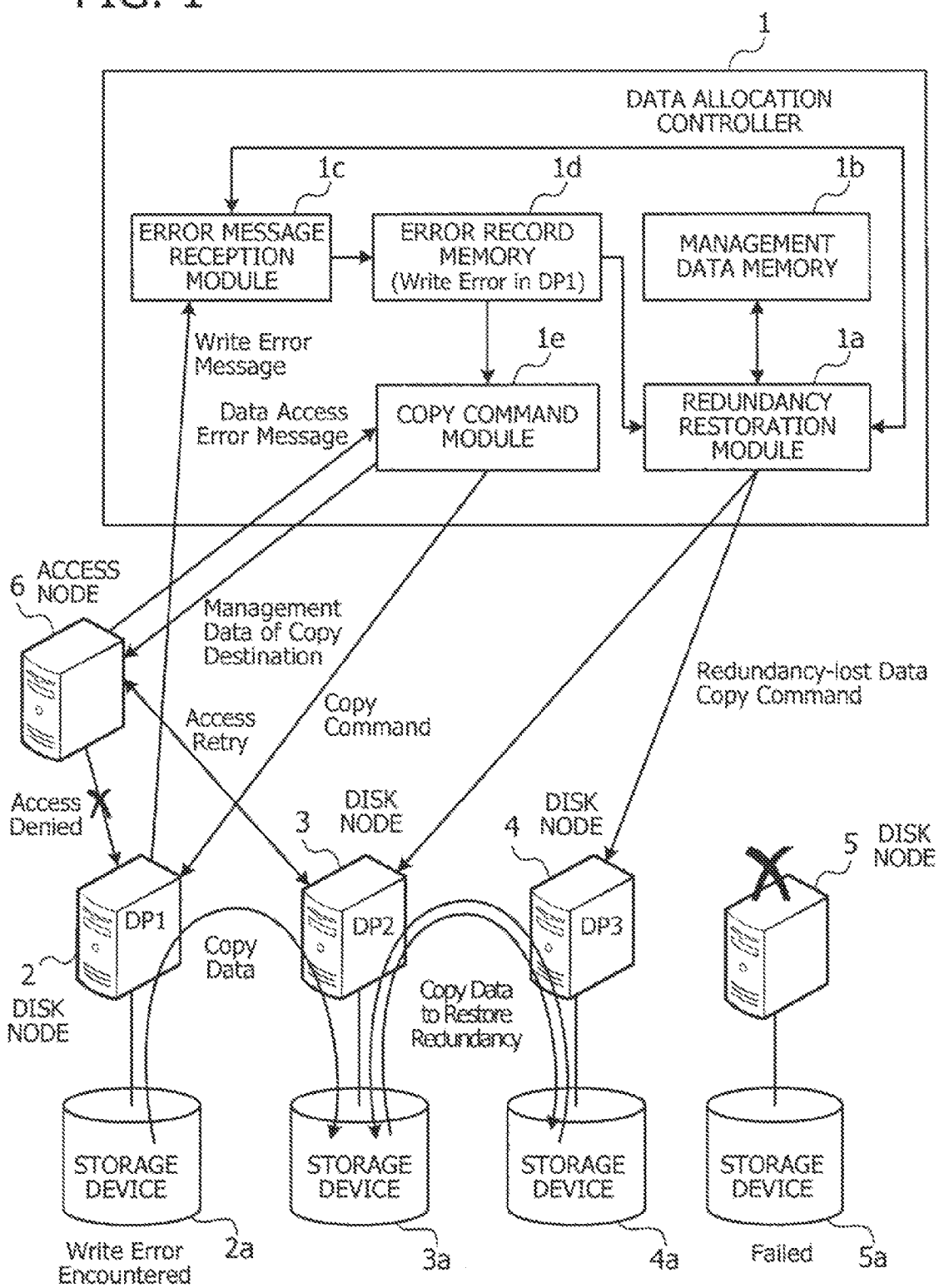
FIG. 1 gives an overview of a first embodiment.

Embodiments of the present invention will be described below with reference to the accompanying drawings, wherein like reference numerals refer to like elements throughout.

First Embodiment

FIG. 1 gives an overview of a first embodiment. The illustrated system includes, among others, a plurality of disk nodes 2, 3, 4, and 5, to which a plurality of storage devices 2a, 3a, 4a, and 5a are attached respectively. Those disk nodes 2 to 5 manage data stored in their corresponding storage devices 2a, 3a, 4a, and 5a. The system also includes a data allocation controller 1 to coordinate allocation of managed data to the disk nodes 2 to 5. The data allocation controller 1 is connected to the disk nodes 2 to 5 via, for example, a network.

When modifying the existing allocation of data, the data allocation controller 1 commands relevant disk nodes to perform a data copy operation. Such modification of data allocation is executed in response to, for example, a write error in a storage device during its data write operation. The data allocation controller 1 is supposed to coordinate data copy operations after a write error in an appropriate way. To this end, the data allocation controller 1 includes a redundancy restoration module 1a, a management data memory 1b, an error message reception module 1c, an error record memory 1d, and a copy command module 1e.

The redundancy restoration module 1a executes a redundancy restoration process in disk nodes. That is, some data stored in storage devices 2a, 3a, 4a, and 5a may lack its redundant copy for some reasons. When such redundancy-lost data is identified in a disk node, the redundancy restoration module 1a commands that disk node to create a new copy of the redundancy-lost data. More specifically, the redundancy restoration module 1a examines the storage devices 2a, 3a, 4a, and 5a to find redundancy-lost data and, if such data is found, creates a management data record in the management data memory 1b to indicate the location of the found redundancy-lost data. The redundancy restoration module 1a sequentially selects each piece of redundancy-lost data indicated by management data records in the management data memory 1b and initiates a data copy operation for the selected redundancy-lost data by sending a command to the disk node managing that data. This copy command specifies a destination storage device which is supposed to store a copy of the selected redundancy-lost data. For example, a storage device with no write error, other than the storage device containing the selected redundancy-lost data, is eligible as the destination storage device.

When the copy operation is finished for all pieces of redundancy-lost data indicated by management data records in the management data memory 1b, the redundancy restoration module 1a disconnects the failed storage device. This disconnection results in a new set of redundancy-lost data. Accordingly, the redundancy restoration module 1a executes another round of data copy operation. More specifically, when the copy operation is finished for all the indicated redundancy-lost data, the redundancy restoration module 1a consults the error record memory 1d to identify a storage device that has encountered a write error. If such a storage device is found, then the redundancy restoration module 1a adds a new management data record to the management data memory 1b to indicate which data will lose its redundancy as a result of subsequent blocking of access to the found storage device. The redundancy restoration module 1a then continues the redundancy restoration process with the newly added management data record in the management data memory 1b.

The management data memory 1b stores, among others, management data records indicating storage locations of redundancy-lost data. The error message reception module 1c may receive a write error message during a redundancy restoration process, which indicates that an error has occurred in writing data to a storage device. When this is the case, the error message reception module 1c stores an identifier of the faulty storage device in the error record memory 1d so as to record the occurrence of a write error in that device. The error message reception module 1c may also receive a similar write error message when there is no ongoing redundancy restoration process. When this is the case, the error message reception module 1c triggers the redundancy restoration module 1a to start a redundancy restoration process for the data whose redundancy will be lost as a result of subsequent blocking of access to the storage device that has encountered a write error.

The error record memory 1d stores identifiers of storage devices that have encountered a write error. In the case where each disk node has only one storage device, the identifiers of disk nodes may be used instead of those of storage devices. In the case where a plurality of storage devices are attached to a single disk node, the identifier of a storage device may be organized as a combination of a disk node identifier and a storage device identifier that is locally unique.

The copy command module 1e consults the error record memory 1d to find a storage device that has encountered a write error (referred to as a faulty storage device). The copy command module 1e then identifies data stored in the faulty storage device as "copy target data," i.e., the data to be duplicated in a subsequent copy operation. The copy command module 1e commands a disk node managing the copy target data to execute a copy operation of that data if its corresponding redundant data does not exist in any storage devices that have no write error. The destination storage device is designated in this command, from among those with no write error. For example, the copy command module 1e may receive a data access error message from some device that has attempted access to data in a faulty storage device without success. The copy command module 1e then identifies the data of that failed access attempt as copy target data. When the copy target data is copied, the copy command module 1e enters a new management data record in the management data memory 1b to indicate the copied data as redundancy-lost data.

In addition to the above, the copy command module 1e returns a response to the source device of the data access error message by sending management data indicating the data that has been duplicated from the copy target data. The duplicated data is supposed to be accessed by the source device. In the example of FIG. 1, an access node 6 has sent a data access error message, and the copy command module 1e thus transmits management data of the produced copy back to the access node 6.

Each disk node 2 to 5 is configured to send a message indicating a write error to the data allocation controller 1 when a write error is encountered. In the example of FIG. 1, the access node 6 is allowed to make access to data managed by those disk nodes 2 to 5. Suppose now that one disk node 5 has failed, for example. This failure causes the redundancy restoration module 1a to start a redundancy restoration process at an appropriate time. For example, the redundancy restoration module 1a examines data managed by other disk nodes 2, 3, and 4 as to whether there is any redundancy-lost data in their respective storage devices 2a, 3a, and 4a. The redundancy restoration module 1a writes management data records describing such redundancy-lost data in the management data memory 1b. Then the redundancy restoration module 1a sequentially selects each piece of redundancy-lost data that is found and sends a copy command to the disk node managing the selected piece of redundancy-lost data. This copy command initiates a data copy operation to create a copy of the selected redundancy-lost data in a storage device other than the source storage device that contains the selected redundancy-lost data. The receiving disk node executes a copy operation for the redundancy-lost data according to the copy command. For example, the disk node 3 reads redundancy-lost data out of its local storage device 3a and creates a copy of the data in another storage device 4a, which is attached to the disk node 4. Similarly, the disk node 4 reads redundancy-lost data out of its local storage device 4a and creates a copy of the in another storage device 3a, which is attached to the disk node 3.

Suppose now that a write error occurs in yet another storage device 2a attached to the disk node 2 during the redundancy restoration process discussed above. This situation may be encountered when, for example, an unrecoverable error is found during a regular data write check operation performed inside the storage device 2a. The write error is reported from the storage device 2a to its corresponding disk node 2. Upon receipt of this information, the disk node 2 sends a write error message to the data allocation controller 1 to indicate the write error detected in the storage device 2a. The information indicating such a write error may include an identifier that uniquely distinguishes the storage device 2a from other storage devices within the system.

The above write error message issued by the disk node 2 reaches the data allocation controller 1 and is received by its error message reception module 1c. Upon receipt, the error message reception module 1c first confirms that a redundancy restoration process is in progress, and then stores the identifier of the faulty storage device in the error record memory 1d as an error record. This record in the error record memory 1d indicates that a write error has occurred in the storage device 2a.

With the error record indicating occurrence of a write error in the storage device 2a, the redundancy restoration module 1a decides not to specify the faulty storage device 2a as a destination storage device where a copy of redundancy-lost data is to be created.

The access node 6, on the other hand, may send an access request to the disk node 2 in an attempt to read or write data in the storage device 2a, whereas a write error has occurred in the storage device 2a. In response to this access request, the disk node 2 returns an error to the requesting access node 6, instead of processing the access request. This error response makes the access node 6 send a data access error message to the data allocation controller 1, so as to indicate that its access attempt to the storage device 2a has failed due to some error. The data access error message contains an identifier that indicates with which piece of data the access request has been denied.

The data allocation controller 1 receives the above data access error message at its copy command module 1e. Based on the received data access error message, the copy command module 1e identifies the data associated with the error and specifies the identified data as copy target data. The copy command module 1e commands the disk node 2 to execute a copy operation of the specified copy target data if its corresponding redundant data does not exist in any error-free storage devices. Here the copy target data is to be duplicated in one of those error-free storage devices. In the example of FIG. 1, the copy command initiates a copy operation from the source storage device 2a to an error-free storage device 3a. The disk node 2 executes this command to create a copy of the specified copy target data.

When the copy is completed, the copy command module 1e sends management data to the access node 6 to indicate where the created copy of the copy target data is available for access. In the example of FIG. 1, it is indicated that the copy is available in the storage device 3a. The management data supplied from the copy command module 1e thus permits the access node 6 to retry the data access, not to the disk node 2, but now to the disk node 3 accommodating the storage device 3a.

It is noted that the storage device 2a is not disconnected from the system even though the storage device 2a has encountered a write error during a redundancy restoration process. The storage device 2a remains connected to the system since the presence of a write error does not necessarily mean that the data stored in the storage device 2a cannot be read at all. A part of copy target data in the storage device 2a is then copied to another storage device if that part has no corresponding redundant data in other storage devices that have no write error. If the copy is completed successfully, it means that the copied part of the copy target data has been saved from loss. In this way, the data allocation controller 1 reduces the probability of data loss due to a write error in the storage device 2a which is detected when a redundancy restoration process is in progress.

Since the storage device 2a remains connected in spite of the occurrence of a write error, the on-going redundancy restoration process copies redundancy-lost data (if any) in the storage device 2a to other storage devices. If the copy is completed successfully, it means that the copied redundancy-lost data has been saved from loss. In this way, the data allocation controller 1 reduces the probability of data loss due to a write error in a storage device which is detected when a redundancy restoration process is in progress.

The above redundancy restoration process has been initiated due to a failure of the storage device 5a. When the redundancy restoration process is completed, all data records in the system have their respective redundant copies. Those two sets of data records are supposed to be stored in different storage devices. The completed redundancy restoration process ensures that all data records in the storage device 2a have their respective counterparts in other storage devices. For this reason, the storage device 2a can safely be disconnected from the system without data loss, after the redundancy restoration process is completed. Accordingly, the system disconnects the faulty storage device 2a after copying every piece of redundancy-lost data registered in the management data memory 1b at the time of the write error. The disconnection of the storage device 2a may lose other storage devices 3a and 4a the redundancy of data. Such data in the storage devices 3a and 4a are thus identified as redundancy-lost data, and the system creates a new copy of each redundancy-lost data in the operational storage devices 3a and 4a. This copy operation restores the redundancy of data in those storage devices 3a and 4a, thus improving reliability of the system.

Second Embodiment

Figure 2:
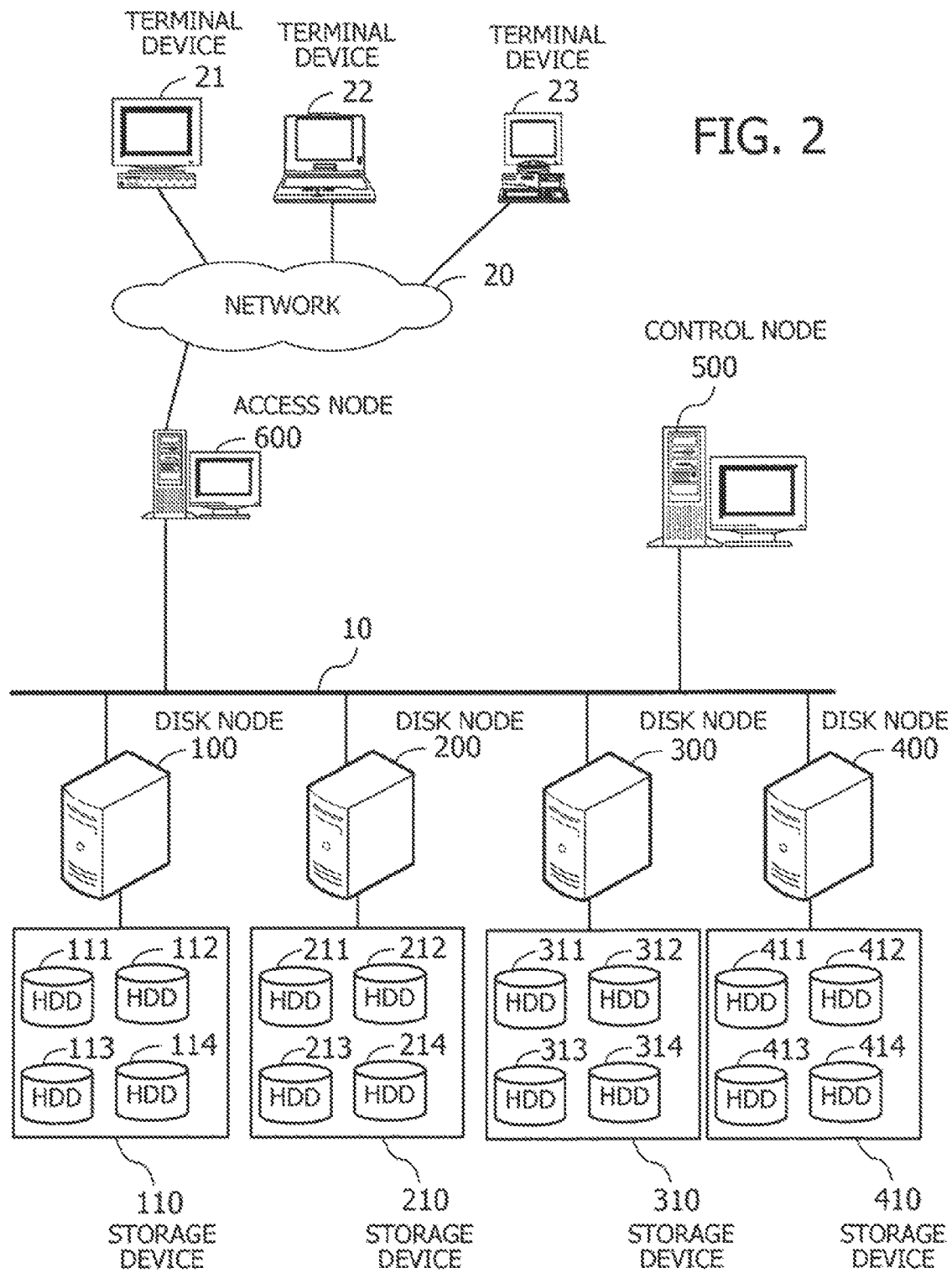
FIG. 2 illustrates an example of a multi-node storage system according to a second embodiment.

The second embodiment offers a specific example of a multi-node system which manages data access by using logical disks. FIG. 2 illustrates an example of a multi-node storage system according to the second embodiment. In this second embodiment, a network 10 interconnects a plurality of disk nodes 100, 200, 300, and 400, a control node 500, and an access node 600. Coupled to the disk nodes 100, 200, 300, and 400 are storage devices 110, 210, 310, and 410.

The leftmost storage device 110 in FIG. 2 accommodates a plurality of hard disk drives (HDD) 111, 112, 113, and 114. Similarly, the next storage device 210 accommodates a plurality of HDDs 211, 212, 213, and 214. The next storage device 310 accommodates a plurality of HDDs 311, 312, 313, and 314. The rightmost storage device 410 accommodates a plurality of HDDs 411, 412, 413, and 414. Those storage devices 110, 210, 310, and 410 organize their respective sets of built-in HDDs as, for example, a redundant array of inexpensive disks (RAID). The present embodiment provides disk management services for those storage devices 110, 210, 310, and 410, each of which is configured as a RAID level 5 (RAID5) system.

The disk nodes 100, 200, 300, and 400 manage data stored in their attached storage devices 110, 210, 310, and 410, so that the managed data will be available to terminal devices 21, 22, and 23 via the network 10. The disk nodes 100, 200, 300, and 400 also support redundancy in their data management, so that the same data is managed in at least two disk nodes.

The control node 500 manages such disk nodes 100, 200, 300, and 400. For example, the disk nodes 100, 200, 300, and 400 may notify the control node 500 that a new storage device is attached to them. Upon receipt of this notification, the control node 500 makes the newly attached storage device accessible through the use of logical disks.

The access node 600 serves a plurality of terminal devices 21, 22, and 23 via the network 20. Logical disks are defined on the access node 600 for access from the terminal devices 21, 22, and 23. In response an access request for specific data in a logical disk, the access node 600 makes access to its corresponding data record in a relevant disk node 100, 200, 300, and 400.

As seen in FIG. 2, each single disk node 100, 200, 300, and 400 in the second embodiment has one attached storage device 110, 210, 310, and 410. For this reason, a failure such as write error in a particular storage device can be treated as a failure in the disk node that accommodates the failed storage device. When a storage device encounters a problem, its corresponding disk node will be disconnected.

Figure 3:
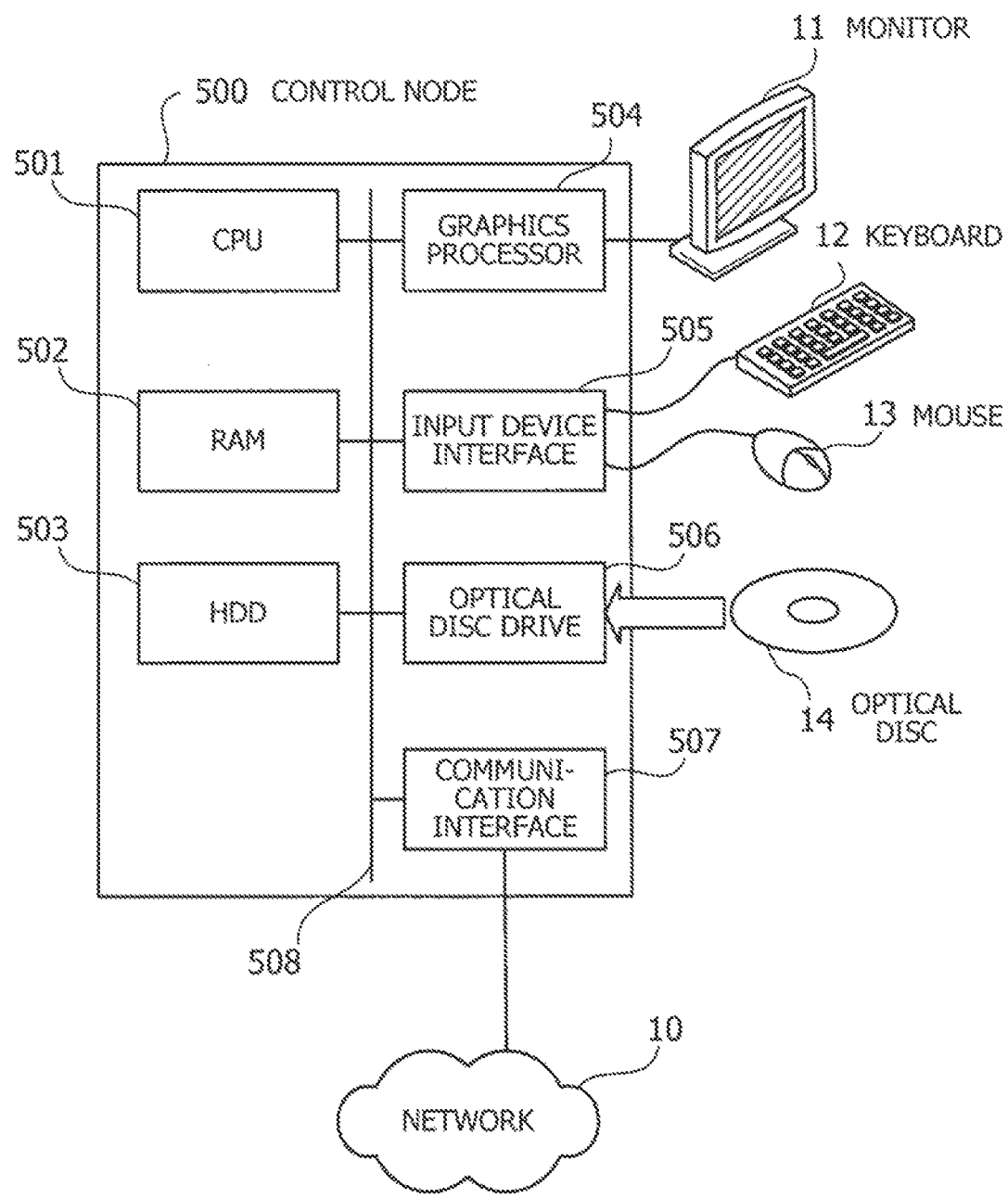
FIG. 3 illustrates an example hardware configuration of a control node in the second embodiment.

FIG. 3 illustrates an example hardware configuration of a control node in the second embodiment. The illustrated control node 500 has a central processing unit (CPU) 501 to control the entire system of the control node 500. The CPU 501 is connected to a random access memory (RAM) 502 and other various peripheral devices on a bus 508.

The RAM 502 serves as primary storage of the control node 500. Specifically, the RAM 502 is used to temporarily store the whole or part of operating system (OS) programs and application programs that the CPU 501 executes, in addition to other various data objects manipulated at runtime.

The peripheral devices on the bus 508 include a hard disk drive (HDD) 503, a graphics processor 504, an input device interface 505, an optical disc drive 506, and a communication interface 507. The HDD 503 writes and reads data magnetically on its internal disk media. The HDD 503 serves as secondary storage of the control node 500 to store program and data files of the operating system and applications. Flash memory and other semiconductor memory devices may also be used as secondary storage, in place of the HDD 503.

The graphics processor 504, coupled to a monitor 11, produces video images in accordance with drawing commands from the CPU 501 and displays them on a screen of the monitor 11. The monitor 11 may be, for example, a cathode ray tube (CRT) display or a liquid crystal display. The input device interface 505 receives signals from external input devices, such as a keyboard 12 and a mouse 13 and supplies them to the CPU 501 in an appropriate form. The mouse 13 is a pointing device, which may be replaced with other kinds of pointing devices such as touchscreen, tablet, touchpad, and trackball.

The optical disc drive 506 reads out data encoded on an optical disc 14, by using a laser light. The optical disc 14 is a portable data storage medium, the data recorded on which can be read as a reflection of light or the lack of same. The optical disc 14 may be a digital versatile disc (DVD), DVD-RAM, compact disc read-only memory (CD-ROM), CD-Recordable (CD-R), or CD-Rewritable (CD-RW), for example. The communication interface 507 is connected to a network 10 so as to exchange data with other computers (not illustrated).

The above-described hardware platform may be used to realize the processing functions of the second embodiment. While FIG. 3 only illustrates an example of the control node 500, the same hardware configuration may also apply to other devices including the disk nodes 100, 200, 300, and 400 and the access node 600. The exception is that the disk nodes 100, 200, 300, and 400 have more peripheral device interfaces (not illustrated) to connect storage devices 110, 210, 310, and 410, in addition to the components illustrated in FIG. 3.

As mentioned above, the proposed multi-node storage system provides logical disks. The following section will describe a data structure of logical disks defined in the system.

Figure 4:
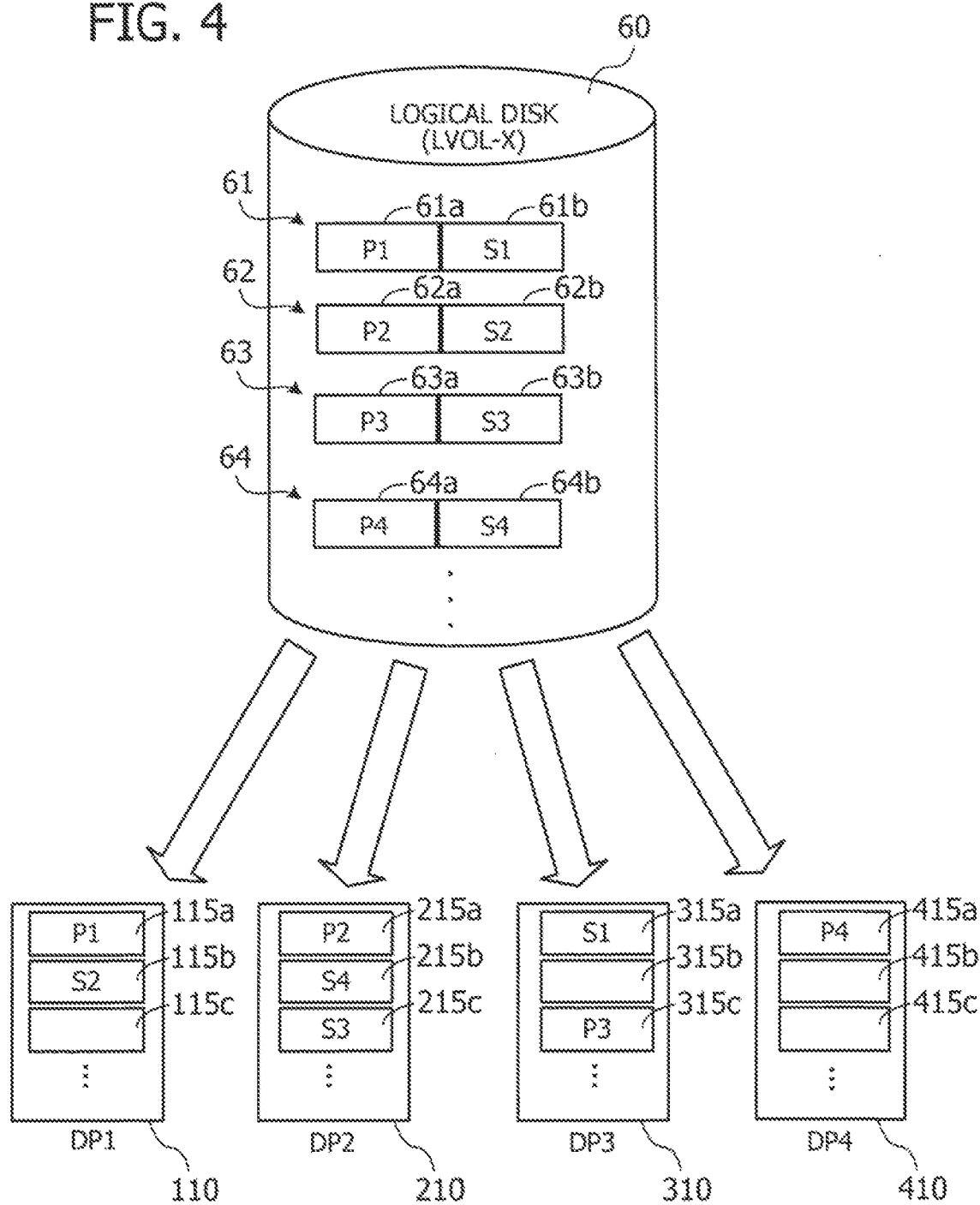
FIG. 4 illustrates an example data structure of a logical disk.

FIG. 4 illustrates an example data structure of a logical disk. According to the second embodiment, the illustrated logical disk 60 is labeled "LVOL-X" as its logical disk identifier. Four disk nodes 100, 200, 300, and 400 on the network are respectively assigned disk node IDs that read "DP1," "DP2," "DP3," and "DP4" for distinction among the nodes. The individual storage devices 110, 210, 310, and 410 attached to the disk nodes 100, 200, 300, and 400 are uniquely identified within the network 10 by specific combinations of a disk node ID and a disk ID.

The storage devices 110, 210, 310, and 410 are each organized as a RAID5 storage system. Storage resources in the storage devices 110, 210, 310, and 410 are managed in the form of a plurality of divided regions, or slices 115a to 115c, 215a to 215c, 315a to 315c, and 415a to 415c, respectively.

The logical disk 60, on the other hand, is organized by segments 61 to 64 as the basic units of storage space. Each segment 61 to 64 provides as large a storage space as a slice, i.e., the constituent element of the storage devices 110, 210, 310, and 410. In the case where, for example, the storage capacity is set to 1 GB per slice, the segments are also configured with the same capacity of 1 GB. The storage capacity of the entire logical disk 60 is thus an integer multiple of the segment capacity. The segments 61, 62, 63, and 64 are each formed from one primary slice 61a, 62a, 63a, and 64a and one secondary slice 61b, 62b, 63b, and 64b, respectively. This combination of primary and secondary slices is referred to as a "slice pair."

Two slices that belong to the same segment are supposed to belong to different disk nodes. The disk nodes have an extra storage area for storing data to manage individual slices, the contents of which include logical disk identifiers, segment parameters, and information describing slices constituting a segment. Also included are flags representing whether the corresponding slice serves as primary slice or secondary slice or other kind of slice described later.

In the example of FIG. 4, each slice in the logical disk 60 is identified by an alphabetical letter of "P" or "S" followed by a numeral. The letter "P" denotes primary slice, while "S" represents secondary slice. The numeral that follows indicates to which segment the slice belongs, or more specifically, its position in the series of segments. For example, identifiers "P1" and "S1" respectively represent the primary and secondary slices of the topmost segment 61 illustrated in FIG. 4.

Figure 5:
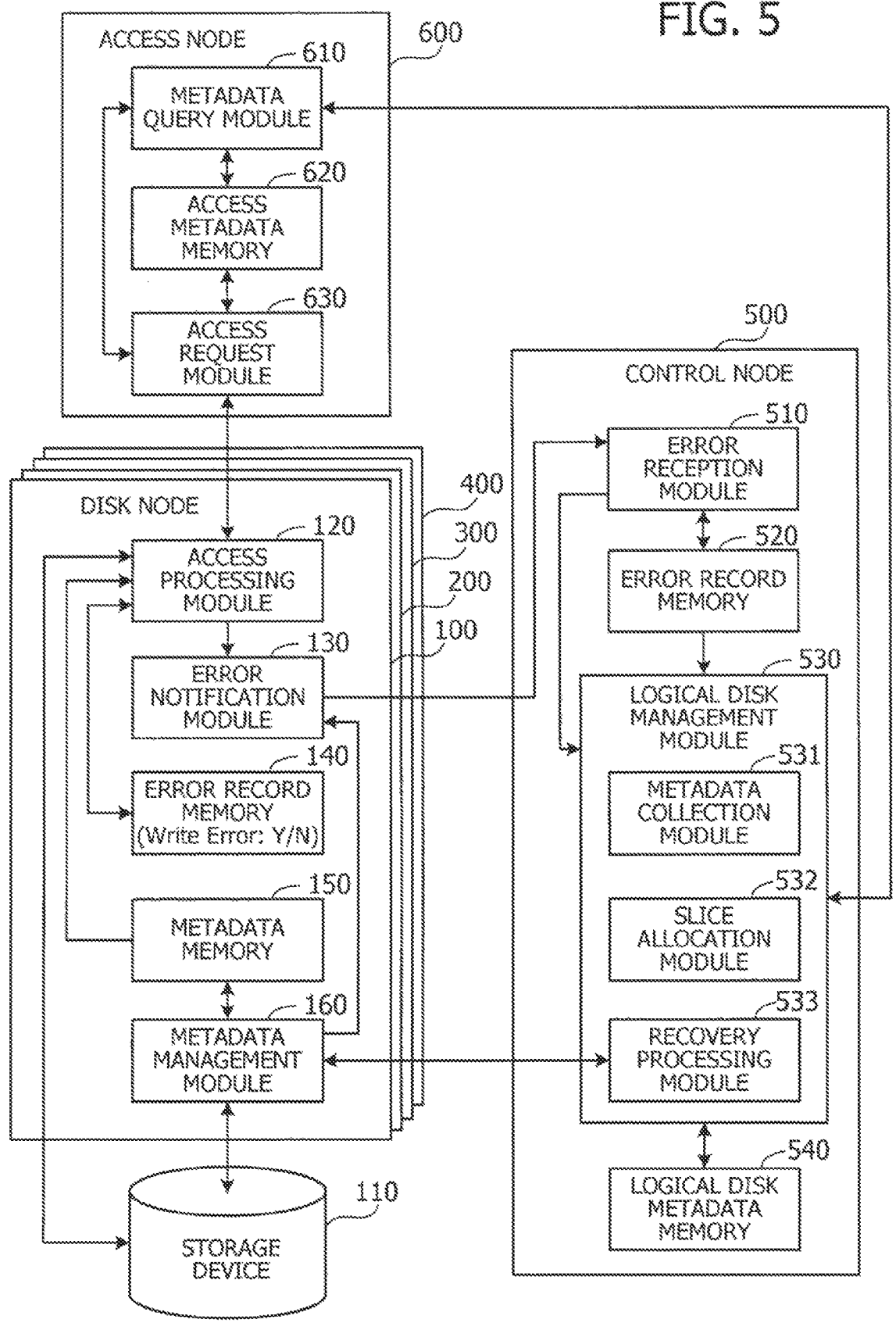
FIG. 5 is a block diagram illustrating functions of various devices constituting a multi-node storage system according to the second embodiment.

FIG. 5 is a block diagram illustrating functions of various devices constituting the multi-node storage system according to the second embodiment. While FIG. 5 depicts detailed functions of only one disk node 100 out of four disk nodes 100, 200, 300, and 400, the same details similarly apply to the other disk nodes. The following description will start with the access node 600. The access node 600 includes a metadata query module 610, an access metadata memory 620, and an access request module 630.

The metadata query module 610 interacts with the control node 500 to collect metadata describing a logical disk 60. More specifically, the metadata query module 610 sends the control node 500 a request for the entire set of metadata records when the access node 600 starts up. In response, the control node 500 provides all relevant metadata records concerning the logical disk 60. The metadata query module 610 also sends the control node 500 a metadata request concerning a specific segment, when the access request module 630 has received an error in its access attempt to a slice allocated to that segment. In this case, the metadata request also plays the role of reporting a data access error to the control node 500, just as does the data access error message in the system discussed in FIG. 1. The control node 500 responds to the request by sending the latest metadata of the specified segment. The metadata query module 610 is coupled to an access metadata memory 620 to store such metadata records obtained from the control node 500.

The access metadata memory 620 stores metadata describing a logical disk 60. For example, the access metadata memory 620 may be implemented as part of RAM in the access node 600. According to the second embodiment, the access node 600 is supposed to make access to primary slices (including single primary slices described later), rather than to secondary slices. This means that the access metadata memory 620 has only to store metadata records concerning primary slices although the metadata records of the logical disk 60 also include those for secondary slices.

The access request module 630 is activated by an access request from terminal devices 21, 22, and 23 (not illustrated in FIG. 5) for specific data in the logical disk 60. In response, the access request module 630 transmits a data access request (e.g., a read or write request) addressed to a relevant storage device 110, 210, 310, and 410. This data access request is transmitted to the disk node to which the specified storage device is attached. More specifically, the access request module 630 receives an access request specifying an address in the logical disk 60. In response, the access request module 630 consults the access metadata memory 620 to find a segment that accommodates the data specified by the request. The access request module 630 then determines which slice is allocated as primary slice of the found segment. The access request module 630 now sends a data access request for the determined slice to the disk node managing that slice. When an access result is returned from the disk node, the access request module 630 forwards it to the requesting terminal 21, 22, and 23.

In the case where an error is returned from the disk node as its access result, the access request module 630 informs the metadata query module 610 of the segment involved in that error. Afterwards, the access request module 630 retries the failed data access, restarting from the step of determining a relevant primary slice by consulting the access metadata memory 620. That is, the access metadata memory 620 may be updated after the previous access request to reflect new allocation of a primary slice for the faulty segment. When this is the case, the updated metadata permits the access request module 630 to determine to which disk node its access request should go.

The disk node 100, on the other hand, includes the following functional blocks: an access processing module 120, an error notification module 130, an error record memory 140, a metadata memory 150, and a metadata management module 160. Details of these components will be described below.

The access processing module 120 serves an access request from the access node 600 by executing the requested access to data in its local storage device 110. More specifically, the access processing module 120 first consults the metadata memory 150 in response to such a request for a specific segment, so as to determine which slice in the storage device 110 is allocated to the requested segment. The access processing module 120 now turns to the determined slice and then makes access to the data specified in the access request. The access request may be, for example, a data read request or a data write request. In the former case, the access processing module 120 reads out requested data from the storage device 110. In the latter case, the access requests contains specific write data. The access processing module 120 writes the data in a relevant storage space in the storage device 110 according to the access request. In either case, the access processing module 120 sends an access result back to the access node 600. In the case of a data read request, the access result includes data read out of the storage device 110.

In the case of a data write request, the access processing module 120 further executes mirroring of data, working together with other disk nodes 200, 300, and 400. In this mirroring process, the access processing module 120 consults again the metadata memory 150 to find a secondary slice that is paired with the primary slice in the disk node 100, the destination of the present write access. The access processing module 120 then sends a data write request to the disk node managing the secondary slice that is found, the request specifying the same data that has just been written into the primary slice. This data write request causes the receiving disk node to write data in the secondary slice.

The disk node 100 may also receive a data write request from other disk node, in the course of a mirroring process initiated by that disk node to duplicate the data written in its primary slice. The data write request carries the same write data for a secondary slice in the disk node 100. The access processing module 120 receives this request. Upon receipt, the access processing module 120 writes the specified data in a relevant slice in the storage device 110.

The above data write operation may, however, end up with a write error in the storage device 110. When this is the case, the access processing module 120 saves an error record in the error record memory 140 to record the write error and notifies the error notification module 130 of the same. Similarly, the access processing module 120 may also handle a write error in the course of write access to the storage device 110 which is initiated by an access request from the access node 600. In this case, the access processing module 120 indicates an error to the requesting access node 600 by issuing an error message.

Upon receipt of such a write error notice from the access processing module 120, the error notification module 130 sends an error message to the control node 500. This message may contain, for example, a disk identifier that indicates the faulty disk node 100.

The error record memory 140 thus stores an error record indicating the fact that the storage device 110 has encountered a write error. The error record may be a flag that takes one of two possible state values, e.g., "YES" to represent the presence of write error and "NO" to represent the absence of write error. For example, the error record memory 140 may be implemented as part of RAM in the disk node 100.

In the example of FIG. 5, the disk node 100 has a single storage device 110. This means that the disk node 100 can uniquely determine the faulty storage device when a local error is detected. Accordingly, the error record in the disk node 100 does not always have to include a storage device identifier. In the case where a plurality of storage devices are attached to the disk node 100, the error record memory 140 has to store as many error records as the attached storage devices. Each error record then contains a storage device identifier so that the disk node 100 can uniquely identify a faulty storage device.

The metadata memory 150 is where the disk node 100 stores metadata of slices that it manages. For example, the metadata memory 150 may be implemented as part of RAM in the disk node 100.

The metadata management module 160 manages metadata of each slice in the storage device 110. More specifically, the metadata management module 160 reads out metadata of each slice from the storage device 110 when the disk node 100 starts up and saves it in the metadata memory 150. When requested by the control node 500, the metadata management module 160 reads out the stored metadata from the metadata memory 150 and sends it to the requesting control node 500. The metadata management module 160 may also receive from the control node 500 a request for changing a specific metadata record. In this case, the metadata management module 160 changes the specified metadata record according to the request, in both the metadata memory 150 and storage device 110.

The description now turns to the control node 500 and its functions. The control node 500 includes an error reception module 510, an error record memory 520, a logical disk management module 530, and a logical disk metadata memory 540. Details of these components will be described below.

The error reception module 510 receives an error message from a disk node which indicates occurrence of a write error. Upon receipt, the error reception module 510 stores an error record in the error record memory 520 in the case where a recovery process is under way for redundancy restoration. The error record indicates that a write error has occurred in a particular disk node, i.e., the source of the error message. In the case where there is no recovery process in progress at the time of receipt of the error message, the error reception module 510 commands a recovery processing module 533 in the logical disk management module 530 to start a recovery process.

The error record memory 520 stores error records indicating presence of a write error in disk nodes. For example, this error record memory 520 may be implemented as part of the RAM 502 or HDD 503.

The logical disk management module 530 manages metadata of each disk node 100, 200, 300, and 400 in the multinode storage system. To this end, the logical disk management module 530 includes a metadata collection module 531, a slice allocation module 532, and a recovery processing module 533.

The metadata collection module 531 collects metadata from disk nodes 100, 200, 300, and 400 at a predetermined time, e.g., when the control node 500 starts up. When the time is reached, the metadata collection module 531 sends a metadata collection request to each disk node 100, 200, 300, and 400. The disk nodes 100, 200, 300, and 400 respond to the request by sending their local metadata records, and the metadata collection module 531 compiles them in a logical disk metadata memory 540.

The slice allocation module 532 allocates a slice to each segment of logical disks 60 (not illustrated in FIG. 5). The slice allocation module 532 executes this operation when, a new logical disk is defined. For example, each segment is supposed to be allocated two slices managed by different disk nodes. Accordingly, the slice allocation module 532 selects slices from among "free slices" that are not allocated to any other segments and have no anomalies. The slice allocation module 532 then updates relevant metadata in the logical disk metadata memory 540 to reflect those newly allocated slices. The slice allocation module 532 further sends a metadata change request containing the updated metadata of slices, to the disk nodes managing the slices.

The slice allocation module 532 also accepts a request from the access node 600 for metadata concerning a specific segment. Upon request, the slice allocation module 532 sends metadata of the slices allocated to the specified segment back to the access node 600. Some of those allocated slices may, however, be in a node that has encountered a write error. In this case, the slice allocation module 532 allocates other slices to the specified segment and sends the requesting access node 600 metadata of the newly allocated slices.

The recovery processing module 533 executes a recovery process for redundancy restoration at a predetermined time, e.g., when a recovery command is received from the error reception module 510. The recovery processing module 533 may also initiate a recovery process when so commanded by, for example, a system administrator.

The logical disk metadata memory 540 is where metadata concerning a logical disk 60 is stored to record the allocation of slices to segments constituting the logical disk 60. For example, this logical disk metadata memory 540 may be implemented as part of the RAM 502 or HDD 503.

Figure 6:
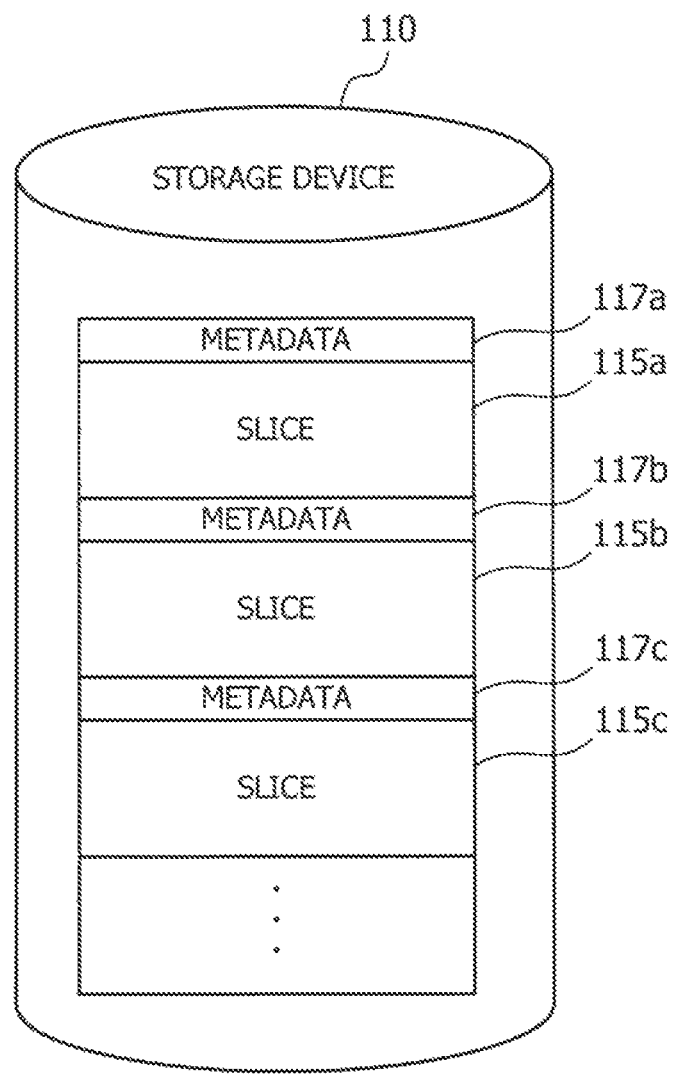
FIG. 6 depicts an example data structure of storage devices.

The above-described nodes manage their data in the form described below. FIG. 6 depicts an example data structure of storage devices. A plurality of metadata records 117a, 117b, 117c, . . . are stored in addition to slices 115a, 115b, 115c, . . . in the storage device 110. Upon startup of the disk node 100, those metadata records 117a, 117b, 117c, . . . are read out of the storage device 110 by the metadata management module 160 and loaded into the metadata memory 150. Despite the metadata locations illustrated in FIG. 6, the storage area of metadata records may not necessarily be located adjacent to their corresponding slices. For example, all those metadata records may be stored together in a single metadata storage area.

Another possible implementation of slices is to divide a single slice into multiple portions and map them to non-contiguous storage areas. For example, a slice is divided into a plurality of data units with a predetermined length. In this case, the metadata of a slice includes information for identifying the location of data corresponding to each data unit. This information may be, for example, an offset relative to top of the storage space of a storage device.

FIG. 7 illustrates an example data structure of a metadata memory. The illustrated metadata memory 150 accommodates a metadata table 151, which is formed from the following data fields: "Disk Node ID," "Disk ID," "Slice ID," "Status," "Logical Disk ID," "Segment ID," "Logical Disk Address," "Paired Disk Node ID," "Paired Disk ID," and "Paired Slice ID." In this metadata table 151, the field values arranged in the horizontal direction are associated with each other, thus forming a single record of metadata.

The disk node ID field contains an identifier (disk node ID) indicating a particular disk node, and the disk ID field contains an identifier (disk ID) indicating a particular storage device. In the example of FIG. 7, the disk node ID and disk ID fields indicate the disk node 100 and its managed storage device 110, respectively. In the case where a plurality of storage devices are attached to the disk node 100, the disk ID field contains different identifiers to designate different storage devices. The slice ID field contains an identifier (slice ID) of a particular slice to indicate which slice this metadata record describes. Slice ID is locally unique in the storage device 110.

The status field contains a flag that indicates in what status the slice is. Specifically, the status flag of a slice is set to "F" when the slice is not allocated to any segments of the logical disk 60. The status flag is set to "P" or "SP" when the slice is assigned as primary storage of a segment of the logical disk 60. The status value "P" denotes a primary slice whose secondary segment (mirror slice) actually exists. The status value "SP" denotes a "single primary slice," i.e., a primary slice whose corresponding mirror slice has been lost due to some failure or the like. In other words, the status value "SP" of a slice means that the redundancy of its corresponding segment has been impaired. The status flag of a slice is set to "S" when the slice is allocated as secondary storage of a segment of the logical disk 60. The status flag is set to "B" when the slice is determined to be faulty. Such faulty slices are rejected as being not qualified for allocation to segments.

As noted, a segment that is allocated a single primary slice lacks redundancy. Such segments with a primary slice alone will be referred to as "impaired segments." When there is an impaired segment, a slice is reserved for use in allocation of a secondary slice. This slice is called a "reserved slice." Data of an impaired segment is copied from its primary slice to a reserved slice, which restores the data redundancy of that segment. During this redundancy restoration process, the reserved slice is given a status value of "R" in its metadata record until the copy of data is completed. When the copy is completed, the reserved slice changes into a secondary slice.

Referring again to FIG. 7, the logical disk ID field of metadata of a slice contains an identifier (logical disk ID) of a particular logical disk 60 to which the segment corresponding the slice belongs. The segment ID field contains an identifier (segment ID) of a particular segment to which the slice is allocated, and the logical disk address field contains an address in the logical disk 60 which points to the top of that segment.

The paired disk node ID field of metadata of a slice contains an identifier (disk node ID) of a particular disk node concerning another slice paired with the slice. That is, the slice of interest is supposed to belong to a particular segment, together with another slice in other storage device. The paired disk node ID identifies the disk node managing this other storage device, and the paired disk ID field contains an identifier (disk ID) of this storage device itself. The paired slice ID is the identifier (slice ID) that indicates which slice in the storage device is paired with the slice of interest.

While FIG. 7 illustrates detailed contents of the metadata memory 150 in the disk node 100, the other disk nodes 200, 300, and 400 also have similar records in their own metadata memory. Those metadata records stored in the disk nodes 100, 200, 300, and 400 are sent from their metadata memory to the control node 500 upon request from the same. In the control node 500, the metadata collection module 531 compiles the received metadata in a logical disk metadata memory 540.

FIG. 8 illustrates an example data structure of a logical disk metadata memory. The illustrated logical disk metadata memory 540 contains a logical disk metadata table 541 which is formed from the following data fields: "Disk Node ID," "Disk ID," "Slice ID," "Status," "Logical Disk ID," "Segment ID," "Logical Disk Address," "Paired Disk Node ID," "Paired Disk ID," and "Paired Slice ID." In this logical disk metadata table 541, the field values arranged in the horizontal direction are associated with each other, thus forming a single record of metadata. The data fields of the logical disk metadata table 541 serve the same functions as their counterparts in the foregoing metadata table 151.

The metadata stored in the logical disk metadata table 541 is available for query by the access node 600. In response to a query message, or a metadata request, from the access node 600, the control node 500 sends a relevant metadata record back to the access node 600. The access node 600 stores the received metadata record in its local storage, or more specifically, in its access metadata memory 620.

The access metadata memory 620 has the same data structure as the foregoing logical disk metadata memory 540. As the access node 600 in the present embodiment is only allowed to make access to primary slices or single primary slices, its access metadata memory 620 may not have to store metadata records of all slices. That is, the metadata records of primary slices and single primary slice (i.e., metadata with a status flag value of "P" or "SP") will suffice for the access node 600. Also the paired disk node ID and paired slice ID fields of metadata records may be left blank in the access metadata memory 620 of the present embodiment.

Figure 9:
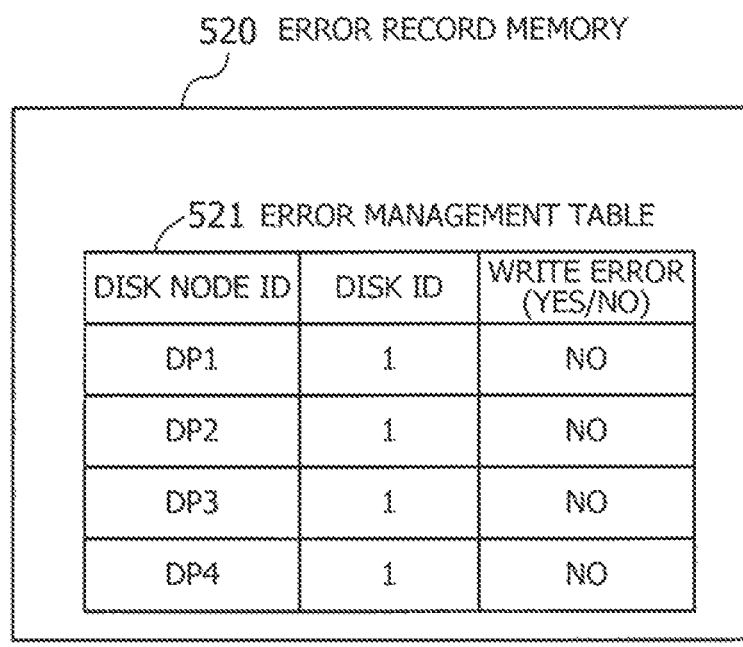
FIG. 9 illustrates an example data structure of an error record memory.

FIG. 9 illustrates an example data structure of an error record memory. The error record memory 520 is supposed to store error records indicating whether each disk node 100, 200, 300, and 400 has ever experienced a write error. To this end, the illustrated error record memory 520 of FIG. 9 contains an error management table 521. This error management table 521 is formed from the following data fields: "Disk Node ID," "Disk ID," and "Write Error." The disk node ID field contains an identifier of each particular disk node, and the disk ID field contains a disk ID to designate a storage device attached to that disk node. The write error field indicates the presence of a write error in the storage device identified by the above two fields. For example, the write error field may have a value of "YES" to indicate presence of a write error or "NO" to indicate absence of write errors.

The above-described multi-node storage system executes a recovery process in the event of a failure in one of the disk nodes. Such failure is detected by, for example, the control node 500. For example, the control node 500 may detect disruption of heartbeat signals from a disk node or may receive an error message from a disk node which indicates a write error that is encountered. The control node 500 identifies such an event as a failure in the disk node.

Suppose now that the system is executing a recovery process as a consequence of a write error in a disk node 400, and during its course, another disk node 100 has also encountered a write error. The following section will describe in detail how the second embodiment behaves in this situation.

Figure 10:
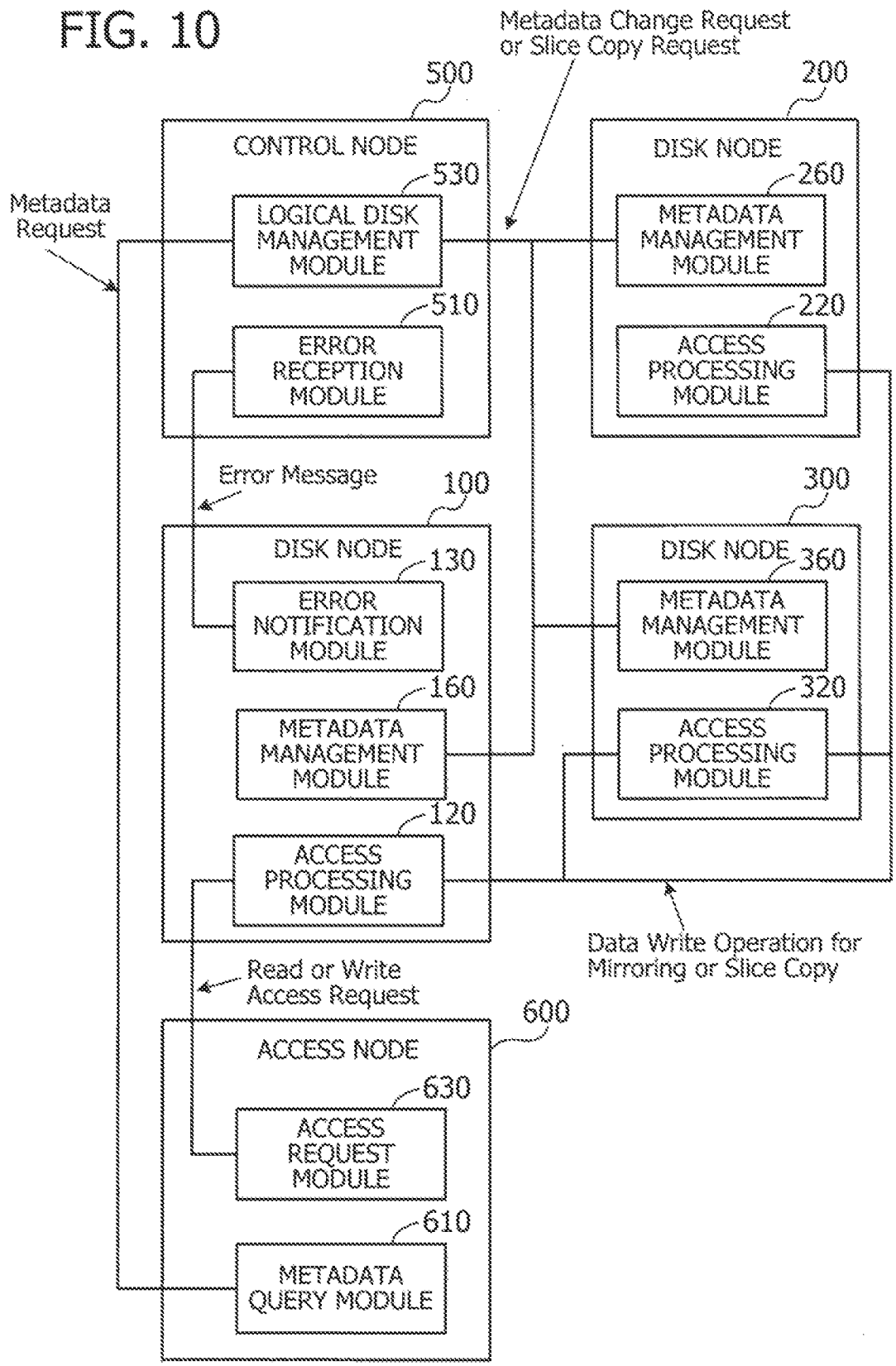
FIG. 10 illustrates an example of information exchanged between devices when a write error is detected in a disk node.

FIG. 10 illustrates an example of information exchanged between devices when a write error is detected in a disk node. It is noted that FIG. 10 omits several functions of the devices to focus on their interactions in this particular situation.

Specifically, metadata change requests, slice copy requests, and other messages are sent from the logical disk management module 530 in the control node 500 to each metadata management module 160, 260, and 360 in disk nodes 100, 200, and 300. An error message is sent from the error notification module 130 in the disk node 100 to the error reception module 510 in the control node 500. The access processing module 120, 220, and 320 in disk node 100, 200, and 300 communicate write data with each other in their mirroring or slice copy operations.

Further, a read or write request is sent from the access request module 630 in the access node 600 to the access processing module 120 in the disk node 100. While not seen in FIG. 10, the access request module 630 may similarly send a read or write request to access processing modules 220 and 320 in other disk nodes 200 and 300. A metadata request is sent from the metadata query module 610 to the logical disk management module 530 in the control node 500.

As can be seen from the above, a plurality of devices communicate with each other and operate together. This is to achieve the following processing: disconnection of a failed disk node, recovery of redundancy for impaired segments, and handling of a write error during a recovery process. The next section will now describe a process of disconnecting a failed disk node.

According to the second embodiment, the multi-node storage system disconnects a faulty disk node unless a recovery process is under way. The disconnection of a faulty disk node is to inhibit the node from being accessed by the access node 600 or being selected as the destination of mirrored data.

Figure 11:
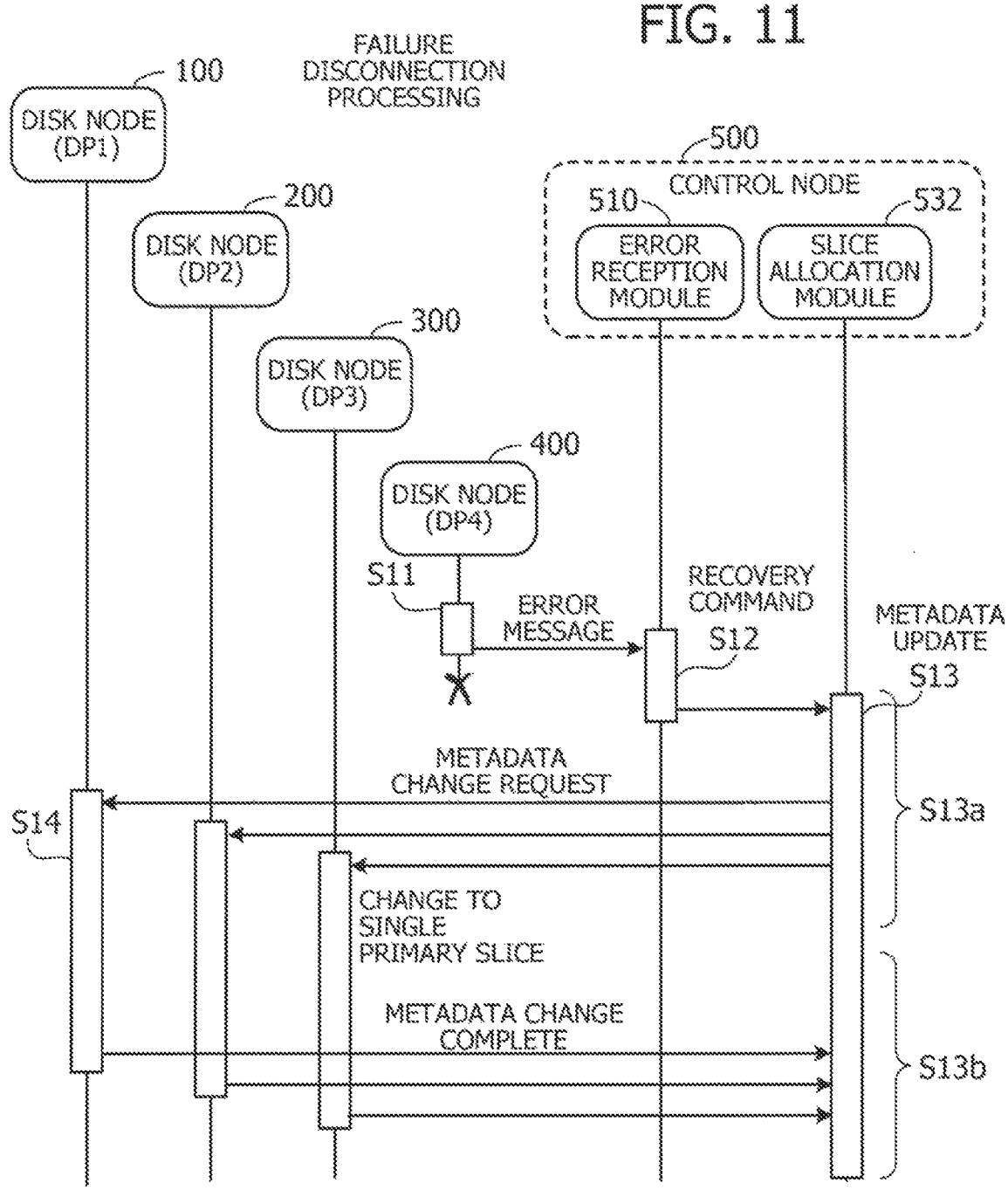
FIG. 11 illustrates an example of how a failed disk node is disconnected.

FIG. 11 illustrates an example of how a failed disk node is disconnected, assuming that a disk node 400 encounter a failure when there is no active recovery process. Each step of FIG. 11 will now be described below in the order of step numbers.

(Step S11) The disk node 400 detects a write error in write access to the storage device 410. Upon detection, the disk node 400 sends an error message to notify the control node 500 of the detected write error.

(Step S12) Upon receipt of the error message, the error reception module 510 in the control node 500 sends a recovery command to the logical disk management module 530 after confirming that no recovery process is in progress.

(Step S13) The slice allocation module 532 in the logical disk management module 530 updates relevant metadata so as to disconnect the disk node 400 because of its write error message. This metadata update process is formed from a failure notification process (Step S13*a*) and a metadata update process for logical disks (Step S13*b*).

(Step S13*a*) The logical disk management module 530 first sends a metadata change request to disk nodes 100, 200, and 300 to change relevant slices to single primary slices. Here the disk nodes 100, 200, and 300 may have some slices paired with the slices managed by the disk node 400. The metadata change request requests each receiving disk node 100, 200, and 300 to change such slices (not only primary slices, but also secondary slices) to single primary slices. The metadata change request thus includes the disk node ID of the faulty disk node 400.

(Step S14) The disk node 100, as one of the recipients of the metadata change request, activates its metadata management module 160 to execute a process of unpairing slices. For example, the metadata management module 160 searches the metadata table 151 in the metadata memory 150 to find metadata records whose paired disk node ID field has a value of "DP4," i.e., the disk node ID of the faulty disk node 400. The metadata management module 160 then changes the status field of the found metadata records to "SP" denoting single primary slices. The metadata management module 160 deletes data in the paired disk node ID filed and paired slice ID field of the found metadata records, thus rendering them "NULL," for example.

When all relevant records in the metadata memory 150 are updated, the metadata management module 160 writes the updated metadata in their corresponding storage areas in the storage device 110. This write operation updates the metadata in the storage device 110, which makes metadata records in the storage device 110 consistent with those in metadata memory 150.

When both the metadata memory 150 and storage device 110 are updated, the metadata management module 160 sends a response message back to the control node 500 to indicate that relevant primary slices are unpaired. With this response message, the control node 500 recognizes that the disk node 100 has finished unpairing its relevant primary slices. Other disk nodes 200 and 300 also performs unpairing of relevant primary slices similarly to the disk node 100. Upon completion, the disk nodes 200 and 300 send a response message back to the control node 500.

(Step S13*b*) Upon receipt of response messages from the disk nodes 100, 200, and 300, the slice allocation module 532 updates metadata in the logical disk metadata memory 540. More specifically, the slice allocation module 532 selects slices paired with the slices managed by the disk node 400 and change those slices to single primary slices by modifying the status field of their respective metadata records. The slice allocation module 532 also clears the paired disk node ID and paired slice ID field of the same metadata records. The slice allocation module 532 further modifies metadata records of slices managed by the disk node 400 by either removing those records from the logical disk metadata memory 540 or changing their status flags to "B" to indicate failure.

As an alternative to the above, the slice allocation module 532 may be configured to re-collect metadata records from all disk nodes 100, 200, and 300, except for the faulty disk node 400, and compile a new logical disk metadata table 541 from the collected metadata records. Note here that the metadata in each healthy disk node 100, 200, and 300 has been updated through the foregoing failure notification process (Step S13a). Accordingly, it is possible to create from the collected metadata records a logical disk metadata table 541 for the system excluding the faulty disk node 400.

The updated metadata in the logical disk metadata table 541 is supplied from the control node 500 to the access node 600 at an appropriate time. For example, the control node 500 commands the disk node 400 to disable its access processing module as the disk node 400 is disconnected. This action causes the access node 600 to experience an access error when it attempts to access the disk node 400. The access node 600 therefore sends a metadata request to the control node 500. In response to this metadata request, the control node 500 provides the latest metadata back to the access node 600. The control node 500 may also be configured to voluntarily send updated metadata in its logical disk metadata table 541 to the access node 600 without any explicit request from the access node 600.

In the logical disk metadata table 541 updated with the disconnection of the faulty disk node 400, all the slices paired with those managed by the disk node 400 have been changed to single primary slices. Subsequent access requests from the access node 600 will thus be directed to single primary slices. The disk node 400 will no longer be selected as a destination of mirrored data because its slices have all been unpaired from other nodes' slices. Slices in the disk node 400 will no longer be allocated to any segments since the metadata records of all those slices have been removed or given a value of "B" in their status flag field.

The above-described processing steps permit the multi-node storage system to stop access to a disk node 400 from other devices in the system. This disconnection process of the disk node 400 completes when there are no pending processes that makes access to the disk node 400. Upon disconnection of the disk node 400, the slice allocation module 532 commands the recovery processing module 533 to start a recovery process. A recovery process is thus executed under the control of the recovery processing module 533.

Figure 12:
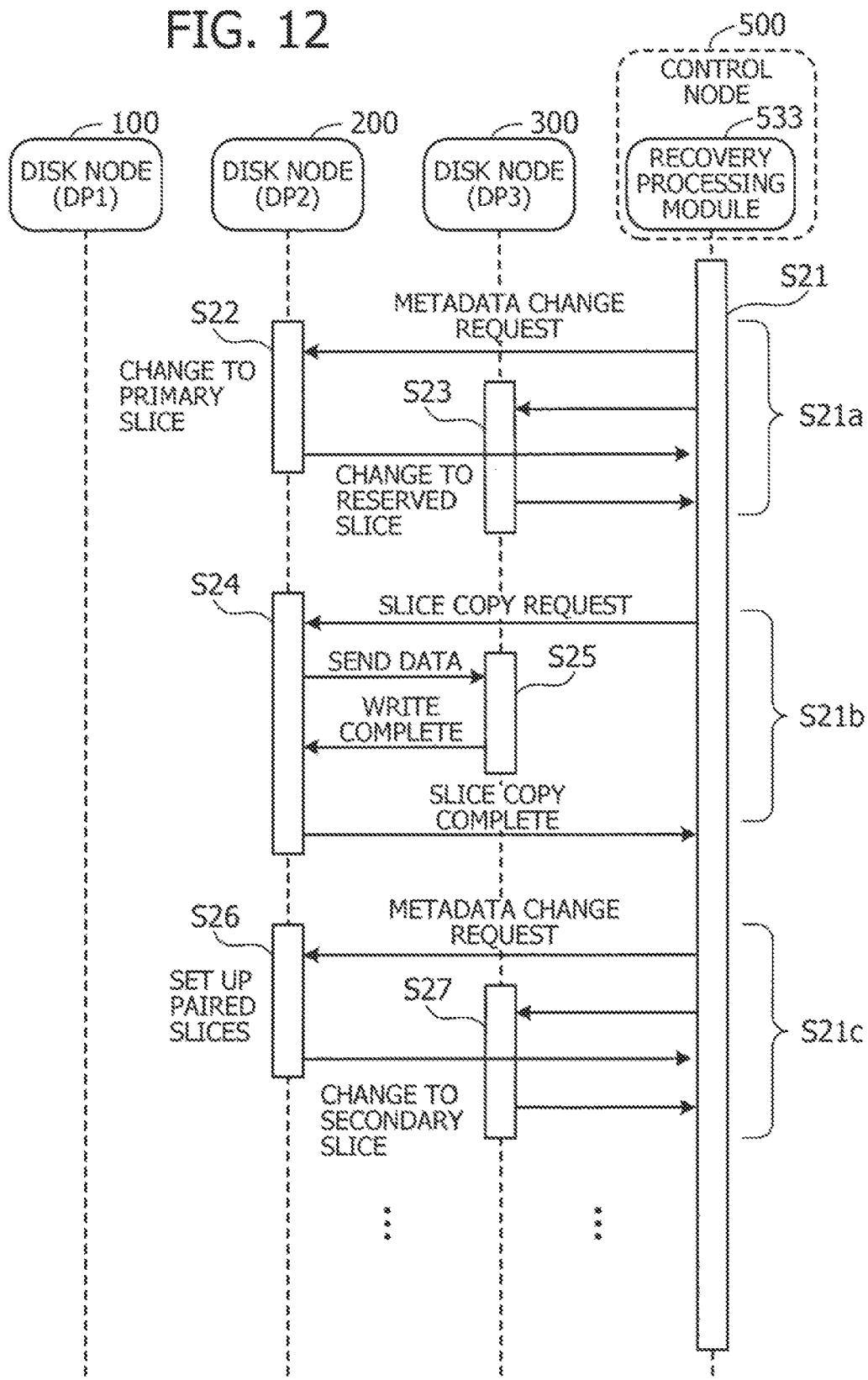
FIG. 12 is a sequence diagram illustrating an example of how a recovery process is executed.

FIG. 12 is a sequence diagram illustrating an example of how a recovery process is executed. Each step of this recovery process will now be described below in the order of step numbers.

(Step S21) In the control node 500, the recovery processing module 533 initiates a recovery process when the disconnection of the faulty disk node 400 is completed. This recovery process is actually formed from the following three parts: reserved slice allocation (step S21a), slice copying (step S21b), and slice status updating (step S21c).

(Step S21a) The recovery processing module 533 selects a single primary slice (slice with a status flag of "SP") by consulting the logical disk metadata table 541. In the example of FIG. 12, a slice is selected from among those managed in a disk node 200. As noted earlier, a segment that is allocated a single primary slice is an impaired segment, and there is such an impaired segment associated with the selected single primary slice. For use as a secondary slice for the impaired segment, the recovery processing module 533 scans the logical disk metadata table 541 to find and select a free slice (slice with a status flag of "F"). The selection of a free slice is made from those managed by a healthy disk node other than the disk node accommodating the selected single primary slice. In the example of FIG. 12, a free slice is selected from among those managed in a disk node 300.

The recovery processing module 533 sends a metadata change request to the disk node managing the selected single primary slice so as to re-pair it with some other slice. This metadata change request contains a specific slice ID to designate the selected single primary slice, which is currently allocated to an impaired segment.

The recovery processing module 533 also sends a metadata change request to the disk node 300 managing the selected free slice so as to change it to a reserved slice. This metadata change request contains a specific slice ID to designate which metadata record should be changed, together with the slice ID of the selected single primary slice and a disk node ID indicating which disk node manages the same.

(Step S22) The disk node 200 now receives a metadata change request for re-pairing a single primary slice. Upon receipt, the metadata management module 260 changes the specified slice to a primary slice. More specifically, the metadata management module 260 selects a metadata record corresponding to the specified slice from among those in the metadata memory and then changes its status flag to "P" by modifying the status field of the selected metadata record. The metadata management module 260 similarly changes a relevant metadata record in the storage device 210 so as to indicate the slice's status as a primary slice. Upon completion of the metadata change, the metadata management module 260 sends a response back to the control node 500 to indicate the completion.

(Step S23) The disk node 300 now receives a metadata change request for reserving a slice. Upon receipt, the metadata management module 360 changes the specified free slice to a reserved slice. More specifically, the metadata management module 360 selects a metadata record corresponding to the specified slice from among those in the metadata memory and then changes its status flag to "R" by modifying the status field of the selected metadata record. The metadata management module 360 similarly changes a relevant metadata record in the storage device 310 so as to indicate the slice's status as a reserved slice. Upon completion of the metadata change, the metadata management module 360 sends a response back to the control node 500 to indicate the completion.

When the update of metadata at steps S22 and S23 is finished, the recovery processing module 533 updates its own metadata in the logical disk metadata memory 540 in the same way as done in the disk nodes 200 and 300.

(Step S21b) Now that the disk nodes 200 and 300 indicate completion of the metadata change, the recovery processing module 533 then initiates a slice copy operation by sending a slice copy request to the disk node 200, which manages the primary slice of the impaired segment. This slice copy request contains a specific slice ID to designate the primary slice of the impaired segment, a disk node ID to designate which disk node manages the reserved slice of interest, and another slice ID to designate the reserved slice.

(Step S24) In the disk node 200, the access processing module 220 receives the slice copy request, which specifies a source slice of data to be copied and a destination slice to be paired with the specified source slice. Upon receipt, the access processing module 220 sends data of the specified source slice to the managing disk node 300 of the destination slice. The slice ID of the destination slice is sent together with this data to specify which slice is to store the data.

(Step S25) In the destination disk node 300, the access processing module 320 receives data from the disk node 200 and stores it in the specified destination slice. When the received data is stored, the access processing module 320 returns a write completion notice to the source disk node 200. This write completion notice causes the access processing module 220 in the source disk node 200 to send a response back to the control node 500 to indicate completion of the slice copy operation.

(Step S21c) Now that the disk node 200 indicates completion of the requested slice copy operation, the recovery processing module 533 in the control node 500 then sends a metadata change request to request the disk node 200 so as to set metadata for the newly paired slices. This metadata change request contains a slice ID to designate the primary slice of the impaired segment, a disk node ID to designate which disk node manages the reserved slice, and another slice ID to designate the reserved slice.

Similarly, with the response from the disk node 200 indicating completion of slice copy, the recovery processing module 533 sends a metadata change request to the disk node 300 so as to change a relevant metadata record for the slice newly assigned as a secondary slice. This metadata change request contains a specific slice ID to designate to which reserved slice the impaired segment is allocated.

(Step S26) The disk node 200 now receives a metadata change request that sets up metadata for newly paired slices. Upon receipt, the metadata management module 260 executes a process of changing metadata of such slices. More specifically, the metadata management module 260 first selects a metadata record corresponding to the specified primary slice from among those in the metadata memory. The metadata management module 260 then changes the paired disk node ID and paired slice ID fields of the selected metadata record by entering the values of disk node ID and slice ID of the reserved slice which are specified in the received metadata change request. The metadata management module 260 similarly changes the paired disk node ID and paired slice ID fields of a relevant metadata record in the storage device 210. Upon completion of such metadata changes, the metadata management module 260 sends a response back to the control node 500 to indicate the completion.

(Step S27) The disk node 300 now receives a metadata change request specifying a particular slice as secondary slice. Upon receipt, the metadata management module 360 changes the specified slice to secondary slice. More specifically, the metadata management module 360 first selects a metadata record corresponding to the specified slice from among those in the metadata memory and then changes its status flag to "S" by modifying the status field of the selected metadata record. The metadata management module 360 similarly changes a relevant metadata record in the storage device 310, so as to indicate its status as a second slice. Upon completion of the metadata change, the metadata management module 360 sends a response back to the control node 500 to indicate the completion.

When the update of metadata at steps S26 and S27 is finished, the recovery processing module 533 updates its own metadata in the logical disk metadata memory 540 in the same way as done in the disk nodes 200 and 300.

Subsequently to the above processing, the recovery processing module 533 in the control node 500 repeats steps S21a, S21b, and S21c until there is no more single primary slice.

In the example discussed in FIGS. 11 and 12, the system disconnects a disk node 400 and executes a recovery process as a result of error found in the disk node 400 in a situation where there is no ongoing recovery process. In the case where there is an ongoing recovery process when an error occurs in a disk node, the system does not disconnect the faulty disk node to avoid data loss. The next section will describe an error handling process executed when a write error is encountered during a recovery process.

Figure 13:
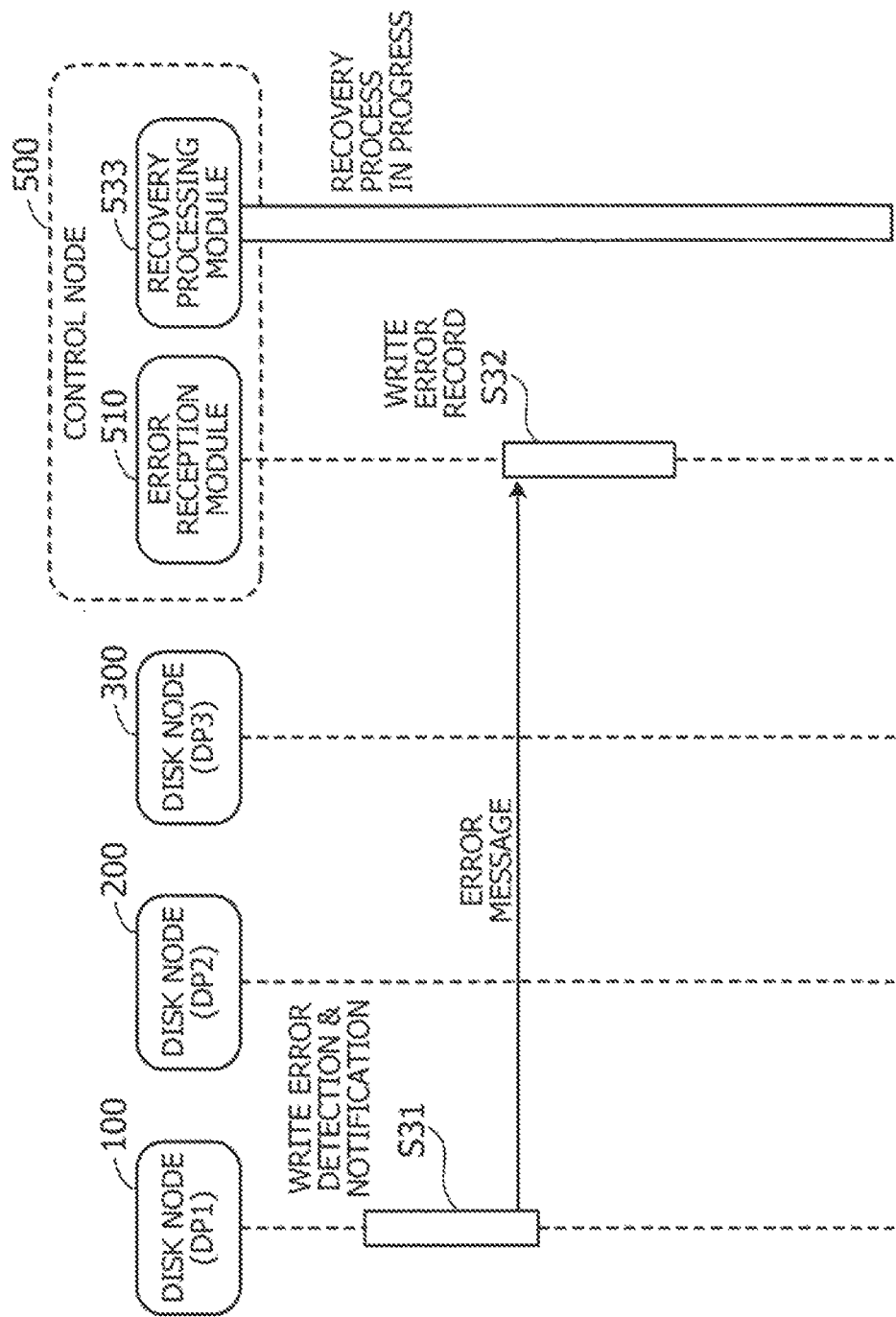
FIG. 13 is a sequence diagram illustrating an example of how a write error is handled when recovery is in progress.

FIG. 13 is a sequence diagram illustrating an example of how a write error is handled when recovery is in progress. More particularly, FIG. 13 illustrates the case where the disk node 100 encounters a write error in its storage device 110 during a recovery process executed by the recovery processing module 533. Each step of FIG. 13 will now be described below in the order of step numbers.

(Step S31) The access processing module 120 in the disk node 100 informs the error notification module 130 of an error detected in its write access operation on the storage device 110. In response, the error notification module 130 sends an error message to the control node 500 to indicate the write error.

(Step S32) In the control node 500, the error reception module 510 receives the message from the disk node 100. Since the recovery processing module 533 is executing a recovery process in the example of FIG. 13, the error reception module 510 writes an error record in the error record memory 520 to record the fact that the disk node 100 has encountered a write error.

As can be seen from the above, a write error in the disk node 100 invokes, not disconnection of the disk node 100, but writing of an error record indicating the write error, in the case where the error is detected when there is a recovery process in progress. The next section will describe an example of detection and notification of a write error in the disk node 100.

Figure 14:
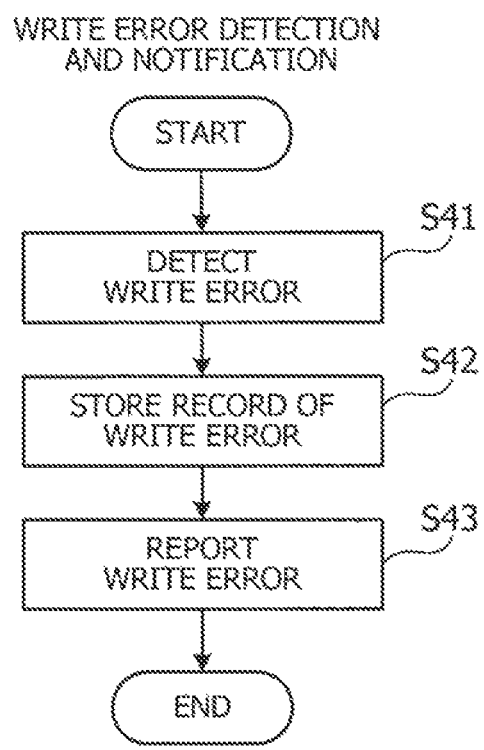
FIG. 14 is a flowchart illustrating an example of how a write error in a disk node is detected and reported.

FIG. 14 is a flowchart illustrating an example of how a write error in a disk node is detected and reported. Each step of FIG. 14 will now be described below in the order of step numbers.

(Step S41) In the disk node 100, the access processing module 120 detects a write error. For example, the access processing module 120 recognizes a write error when it fails to write data in the storage device 110 upon access request from the access node 600. Another case of recognizing a write error is when the access processing module 120 fails to write data in the storage device 110 in an attempt to execute a request from other disk nodes 200 and 300 executing a mirroring process. Yet another case of recognizing a write error is when the access processing module 120 fails to write data in the storage device 110 upon receipt of a slice copy request from other disk nodes 200 and 300.

Still another case of recognizing a write error is when the storage device 110 finds an error in its self-check process, which is executed automatically at regular intervals. In this case, the access processing module 120 recognizes a write error through a message sent from the storage device 110 which indicates error in its self-check process.

Most storage devices are configured to protect themselves against failure in writing data in a unit storage space (block) by providing a spare block for replacement of a failed block. This configuration permits the storage unit to recover from a local write error, and in which case the storage device does not need to return an error message to the corresponding disk node as a response to its data write request. Spare blocks in a storage device are, however, limited in number. Once those spare blocks are exhausted, the storage device can no longer save subsequent data write operations from failure because of the lack of alternative blocks for write data. This situation forces the storage device to return a write error to its associated disk node. The access processing module 120 may recognize such an unrecoverable write error in the storage device 110 and send an error message to the control node, while neglecting recovered write errors.

(Step S42) Upon detection of a write error, the access processing module 120 saves an error record in the error record memory 140, together with a disk ID indicating the faulty storage device, thus making a record of the write error. For example, the access processing module 120 changes the relevant write error flag in the error record memory 140 from "NO" to "YES" to indicate the presence of error.

(Step S43) The access processing module 120 informs the error notification module 130 of the occurrence of a write error. This information from the access processing module 120 causes the error notification module 130 to send an error message to the control node 500 to report the write error.

As can be seen from the above, a write error in a storage device 110 causes its associated disk node 100 to send an error messages to the control node 500, as well as to store an error record indicating the write error. Upon receipt of the error message, the control node 500 starts a recovery process or to store an error record.

Figure 15:
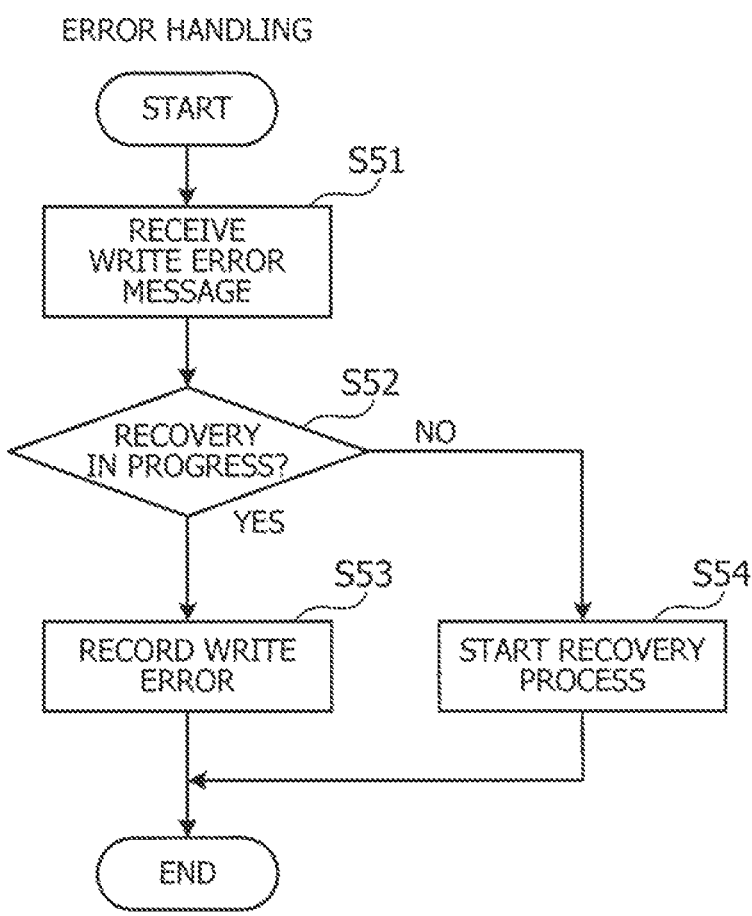
FIG. 15 is a flowchart illustrating an example of how a received error message is handled.

FIG. 15 is a flowchart illustrating an example of how a received error message is handled. Each step of FIG. 15 will now be described below in the order of step numbers.

(Step S51) In the control node 500, the error reception module 510 receives an error message from a disk node 100, which indicates detection of a write error.

(Step S52) The error reception module 510 determines whether there is a recovery process in progress. For example, the error reception module 510 determines that a recovery process is in progress when there is an active process of the recovery processing module 533. As an alternative, the error reception module 510 may be configured to search the logical disk metadata memory 540 for single primary slices. If a single primary slice is found, it suggests that there is a recovery process in progress. The presence of an ongoing recovery process makes the process advance to step S53. Otherwise, the process proceeds to step S54.

(Step S53) Now that a recovery process is under way, the error reception module 510 writes an error record in the error record memory 520 to indicate that the disk node 100 has encountered a write error. For example, the error reception module 510 searches an error management table 521 in the error record memory 520 to find a record with a disk node ID that matches with the disk node from which the error message has been received. The error reception module 510 then modifies the write error field of the found record by entering a flag indicating a write error. The error handling process of FIG. 15 is thus terminated.

(Step S54) Now that no recovery process is under way, the error reception module 510 commands the recovery processing module 533 to start a recovery process. The recovery processing module 533 thus initiates a recovery process, and the error handling process of FIG. 15 is terminated.

As can be seen from the above, the received write error message is handled in different ways depending on whether there is a recovery process in progress. That is, if there is an ongoing recovery process, the error is recorded. If there is no ongoing recovery process, then a recovery process is newly invoked.

Figure 16:
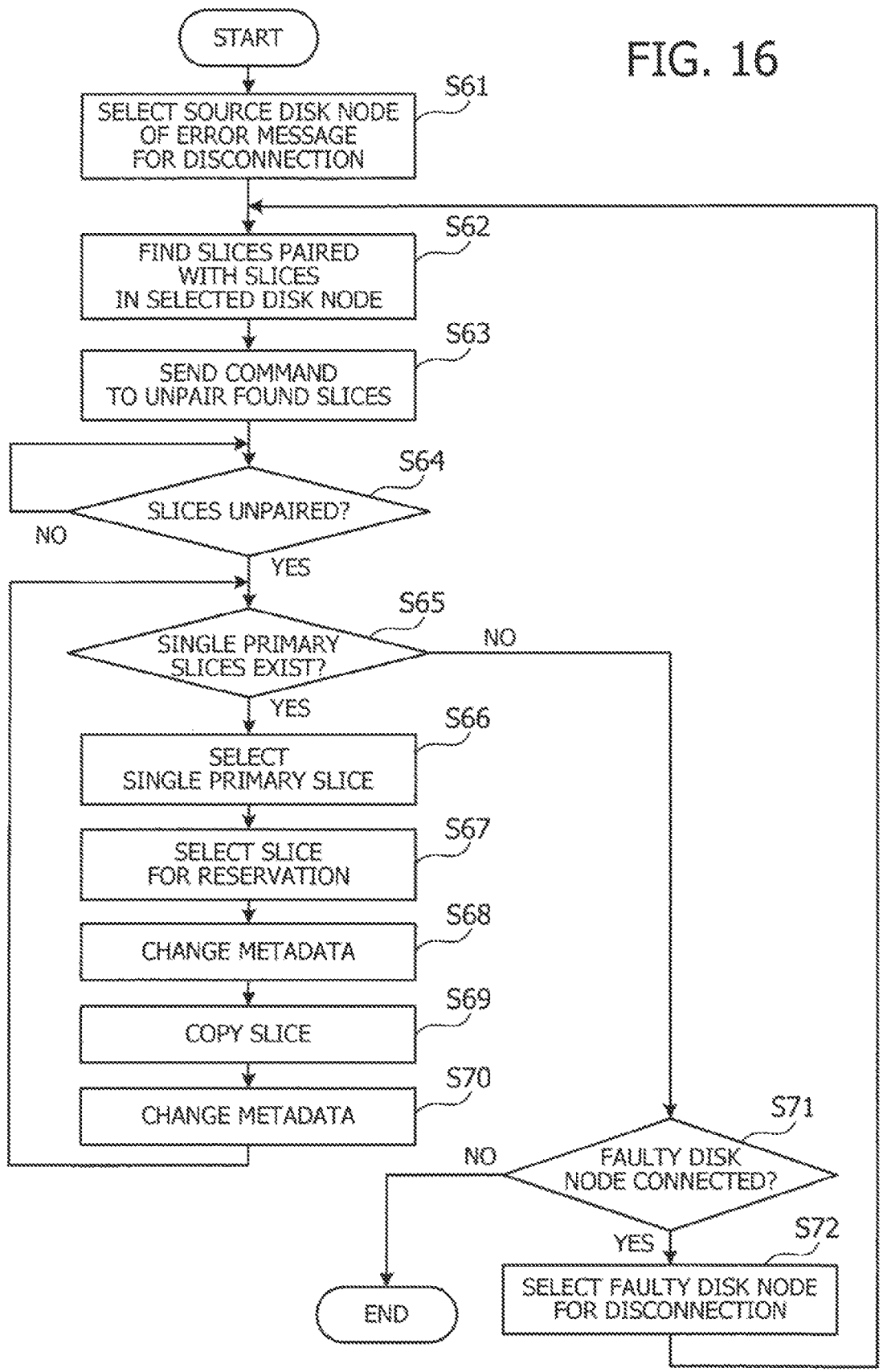
FIG. 16 is a flowchart illustrating an example of how a recovery process is executed.

FIG. 16 is a flowchart illustrating an example of how a recovery process is executed. Each step of FIG. 16 will now be described below in the order of step numbers.

(Step S61) For subsequent disconnection processing, the recovery processing module 533 selects the disk node from which the error message has been received. The recovery processing module 533 removes a record relevant to the selected disk node from the error management table 521.

(Step S62) The recovery processing module 533 finds slices that are paired with slices managed by the selected disk node. For example, the recovery processing module 533 searches the paired disk node ID field of the logical disk metadata table 541 to find metadata records having the disk node ID of the selected disk node. Then the slices corresponding to the found metadata records are selected as being paired with the slices managed by the selected disk node.

(Step S63) The recovery processing module 533 identifies disk nodes that manage the selected slices and commands those disk nodes to unpair the slices, so that the slices will be single primary slices. For example, the recovery processing module 533 sends a metadata change request to each identified disk node. This request contains the slice IDs of the relevant slices to specify which slices should be unpaired.

(Step S64) The recovery processing module 533 determines whether every specified slice has been changed to single primary slice. For example, the recovery processing module 533 recognizes completion of the unpairing operation when a completion notice has been returned for every metadata change request that it has issued. When every issued request is found completed, the process advances to step S65. Otherwise, the process repeats step S64. It is noted that, when the unpairing operation is completed, the recovery processing module 533 updates metadata records of the selected slices in the logical disk metadata table 541 so that their status field will indicate their new status as single primary slices.

(Step S65) The recovery processing module 533 determines whether there is a single primary slice. For example, the recovery processing module 533 searches the logical disk metadata table 541 to find a metadata record having a status flag of "SP" in its status field. If at least one such metadata record is found, it means presence of single primary slices. If no such metadata records are found, it means absence of single primary slices. In the former case, the process advances to step S66. In the latter case, the process branches to step S71.

(Step S66) The recovery processing module 533 selects one of the found single primary slices for the subsequent processing of recovery. This slice is referred to as a "recovery target slice." For example, the recovery processing module 533 extracts from the logical disk metadata table 541 one metadata record having a status flag of "SP" in its status field and selects the slice corresponding to the extracted metadata record.

(Step S67) The recovery processing module 533 selects a slice for reservation. For example, the recovery processing module 533 extracts from the logical disk metadata table 541 one metadata record that has a status flag of "F" in its status field and whose corresponding slice is managed by a disk node other than that of the recovery target slice. Then the recovery processing module 533 selects the slice corresponding to the extracted metadata record. The selected slice is referred to as a "reservation target slice."

The recovery processing module 533 may be configured to check the error management table 521 to find disk nodes experiencing a write error, and not to select slices in such disk nodes as reservation target slices. Selecting those slices for reservation would end up with an error in their slice copy operation and thus cause the recovery processing module 533 to seek alternative reservation target slices. This extra task of seeking alternatives can be prevented by removing slices in a faulty disk node from reservation target slices.

(Step S68) The recovery processing module 533 changes metadata concerning the above recovery target slice and reservation target slice. For example, the status of recovery target slice is changed from single primary slice to primary slice, while the status of reservation target slice is changed from free slice to reserved slice. More specifically, the recovery processing module 533 sends a metadata change request to each disk node managing those slices so as to change their metadata records. The recovery processing module 533 also updates its local logical disk metadata table 541 to apply similar changes to metadata of the recovery target slice and reservation target slice.

(Step S69) The recovery processing module 533 sends a slice copy request to the disk node managing the selected single primary slice, so that data is copied from the primary slice to the reserved slice. Upon completion of this copy operation, the disk node returns a completion response to the recovery processing module 533.

(Step S70) The recovery processing module 533 changes metadata such that the recovery target slice will be paired with the reservation target slice. The recovery processing module 533 also changes metadata such that the reserved slice will be a secondary slice. More specifically, the recovery processing module 533 sends a metadata change request to the disk node managing the primary slice. This request specifies which reserved slice is to be paired with the primary slice. The recovery processing module 533 also sends a metadata change request to the disk node managing the reserved slice so as to change its status from reserved slice to secondary slice. The recovery processing module 533 further updates its local logical disk metadata table 541 to apply similar changes to metadata of the primary slice and reserved slice. The process then goes back to step S65 for another single primary slice.

(Step S71) Now that there is no more single primary slice to process, the recovery processing module 533 determines whether there remains any faulty disk node that has a record of write error but has not yet been disconnected. For example, the recovery processing module 533 searches the error record memory 520 to find a disk node with "YES" in its write error field. If such a faulty node is found connected, the process advances to step S72. If no such nodes are found, the process is terminated.

(Step S72) The recovery processing module 533 selects a non-disconnected faulty disk node as a new disconnection target node. Here the recovery processing module 533 removes a record relevant to the selected disk node from the error management table 521. The process then goes back to step S62 for further processing.

As can be seen from the above, a write error in a disk node necessitates disconnection of that faulty disk node, but this disconnection will not be executed until every existing single primary slice is dissolved by the on-going recovery process. Dissolution of single primary slices means that the data of every segment is duplexed. That is, the redundancy of segment data has been restored, which justifies disconnection of the faulty disk node. The disconnection of a disk node results in a new set of single primary slices, which are then subjected to another recovery process to restore the redundancy of data.

When there is an access request from some external node to a slice in a faulty disk node, the segment corresponding to the slice is changed to an impaired segment before disconnection of the faulty disk node. This change causes a redundancy restoration process for the segment of interest. A disk node may receive access requests from external sources, which include, for example, read or write access requests from an access node 600, mirror write requests from peer disk nodes, and slice copy requests or data write requests during a recovery process. The control node 500 is notified of such an access request to a faulty disk node, including the information on which slice is specified in the request.

Disk nodes are designed to accept read access from the control node 500 regardless of write error, whereas they reject access requests from other external nodes. For example, a disk node may receive a slice copy request during the course of a recovery process or slice allocation process. In this case, the disk node serves as a source node that provides slice data for copying purposes. Even a disk node with a write error can be a source node since it has only to perform a data read operation.

The procedure of notifying the control node 500 of the accessed slice may vary depending on what kind of access was made to the disk node in question. The following description is directed to a procedure of how to notify the control node 500 of the accessed slice.

Figure 17:
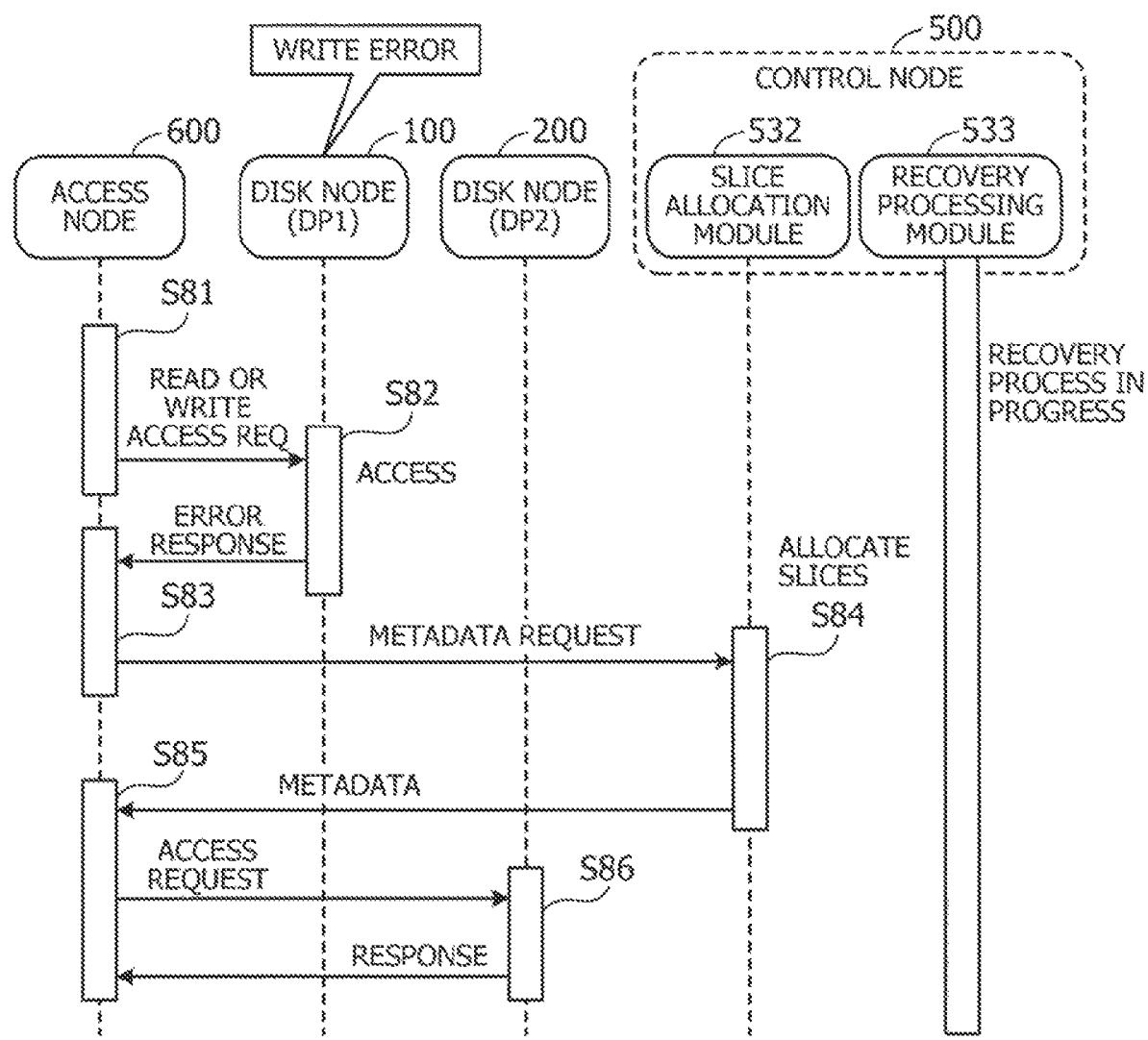
FIG. 17 is a sequence diagram illustrating how an access request is processed when the request is directed to a disk node with a write error.

FIG. 17 is a sequence diagram illustrating how an access request is processed when the request is directed to a disk node with a write error. Each step of FIG. 17 will be described below in the order of step numbers, assuming that the disk node 100 has an error record indicating occurrence of a write error, and that the recovery processing module 533 in the control node 500 is executing a recovery process.

(Step S81) The access request module 630 in the access node 600 sends a read or write access request to a disk node 100 upon demand from a terminal device.

(Step S82) In the disk node 100, the access processing module 120 receives the access request from the access node 600. By consulting the error record memory 140, the access processing module 120 recognizes the presence of a write error and thus returns an error response to the access node 600. The details of this operation will be described later with reference to FIG. 18.

(Step S83) The error response is received by the access request module 630 in the access node 600. Upon receipt, the access request module 630 requests the metadata query module 610 to provide relevant metadata. The metadata query module 610 sends the control node 500 a metadata request for a segment specified in the failed access request.

(Step S84) In the control node 500, the slice allocation module 532 receives the metadata request indicating a specific segment. With the reception of this metadata request, the slice allocation module 532 recognizes the fact that an access attempt to the primary slice of that specific segment has ended up with an error. The slice allocation module 532 then searches the error record memory 520 to find a relevant error record and recognizes that the primary slice of interest is managed by a disk node 100 having a record of write error. Accordingly, the slice allocation module 532 executes a slice allocation process, the details of which will be described later with reference to FIG. 22. It is assumed in the example of FIG. 17 that the slice allocation process assigns a slice in the disk node 200 as the primary slice of the segment specified in the above metadata request. Upon completion of this slice allocation process, the slice allocation module 532 returns a metadata record of the segment of interest to the access node 600 as a response to the metadata request.

(Step S85) The access node 600 receives metadata from the control node 500, which permits the access request module 630 to retry the once-failed access according to the received metadata record. For example, the access request module 630 stores the received metadata record in the access metadata memory 620. With the received metadata record, the access request module 630 determines which slice is assigned to the segment of interest and sends an access request to the managing disk node of that slice. In the example of FIG. 17, the access request is addressed to a disk node 200.

(Step S86) In the disk node 200, the access processing module 220 executes access to its attached storage device 210 according the received access request. The access processing module 220 then sends the access result back to the requesting access node 600.

Figure 18:
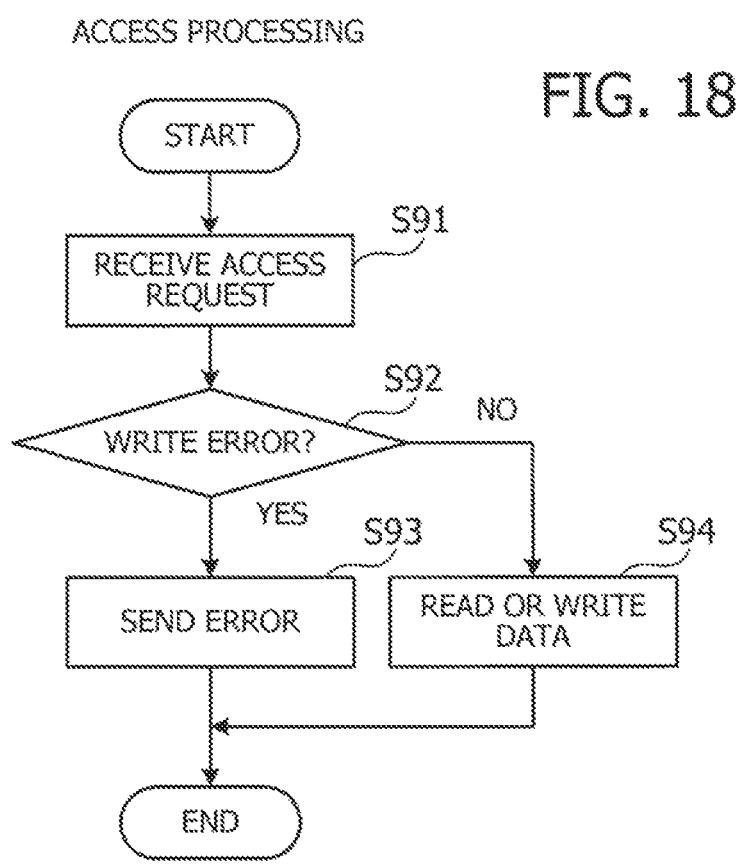
FIG. 18 is a flowchart illustrating an example of an access procedure.

The following will describe in detail how a disk node executes an access request from the access node 600. FIG. 18 is a flowchart illustrating an example of an access procedure. Each step of FIG. 18 will now be described below in the order of step numbers.

(Step S91) The access processing module 120 in the disk node 100 receives a read or write access request from the access node 600.

(Step S92) By consulting the error record memory 140, the access processing module 120 determines whether there is a record of write error. If there is a record of write error, the process advances to step S93. If there is no record of write error, the process proceeds to step S94.

(Step S93) Since there is a record of write error, the access processing module 120 sends an error back to the requesting access node 600 and thus terminates the access processing.

(Step S94) Since there is no record of write error, the access processing module 120 executes a data read or write operation on the storage device 110 according to the received access request. The access processing module 120 then returns the result of the executed operation back to the access node 600. In the case of, for example, read operation, the access processing module 120 sends the read data to the access node 600. In the case of write operation, the access processing module 120 sends a response message back to the access node 600 to indicate completion of the requested write operation. The access processing is then terminated.

As can be seen from the above, the disk node 100 executes a data access operation according to a given access request. In addition to the above-described access request from the access node 600, the disk node 100 may also receive a mirror write request from peer disk nodes. The following will describe a procedure of mirror write processing.

Figure 19:
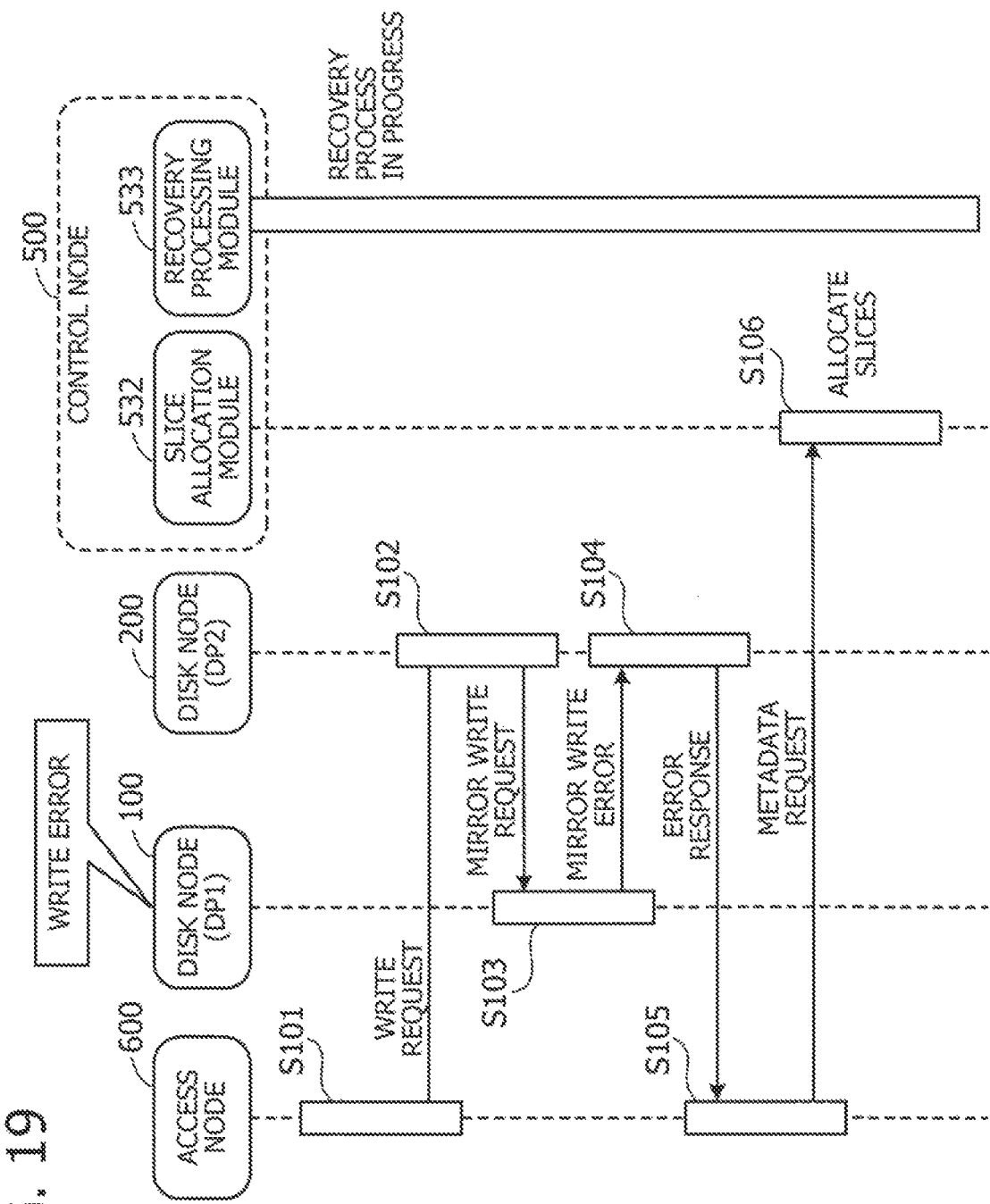
FIG. 19 is a sequence diagram illustrating a procedure of mirror write processing on disk nodes in the case of a write error.

FIG. 19 is a sequence diagram illustrating a procedure of mirror write processing on disk nodes in the case of a write error. The illustrated sequence diagram assumes that the access node 600 issues an access request for writing data in a segment whose primary and secondary slices are managed by disk nodes 300 and 100, respectively. Each step of FIG. 19 will now be described below in the order of step numbers.

(Step S101) The access request module 630 in the access node 600 sends a write request to the disk node 300.

(Step S102) In the disk node 300, the access processing module 320 receives and executes this write access request by writing specified data to its attached storage device 310. In addition, the access processing module 320 sends a mirror write request to the managing disk node 100 of the secondary slice.

(Step S103) Upon receipt of the mirror write request, the access processing module 120 in the disk node 100 determines whether it has a write error. Since, in the example of FIG. 19, the disk node 100 has a record indicating a write error, the access processing module 120 returns a mirror write error message to the requesting disk node 300.

(Step S104) Upon receipt of the mirror write error message, the access processing module 320 in the disk node 300 sends an error message to the access node 600 to indicate the presence of a write error.

(Step S105) The error response is received by the access request module 630 in the access node 600. Upon receipt, the access request module 630 requests the metadata query module 610 to obtain relevant metadata. The metadata query module 610 sends the control node 500 a metadata request for a segment specified in the failed access request.

(Step S106) In response to the metadata request, the slice allocation module 532 in the control node 500 executes a slice allocation process. For details of this S106 and subsequent steps, see the foregoing description of steps S84 to S86 in FIG. 17.

As can be seen from the above, the disk node with a write error responds to a mirror write request by sending an error, which causes the access node 600 to transmit a metadata request to the control node 500. In response, the control node 500 investigates which slice is allocated to the segment to which the failed mirror write request was directed and cancels the allocation of that slice.

The disk node 100 with a write error may also be accessed from other disk nodes when they execute a slice copy operation. Suppose, for example, that the disk node 100 is selected to provide a reserved slice in a recovery process. In this case, a slice copy operation is initiated to duplicate the entire data of a primary slice to its corresponding reserved slice in the disk node 100. The disk node 100 may, however, encounter a write error during this slice copy operation. If this is the case, the initiated slice copy operation fails with an error.

Figure 20:
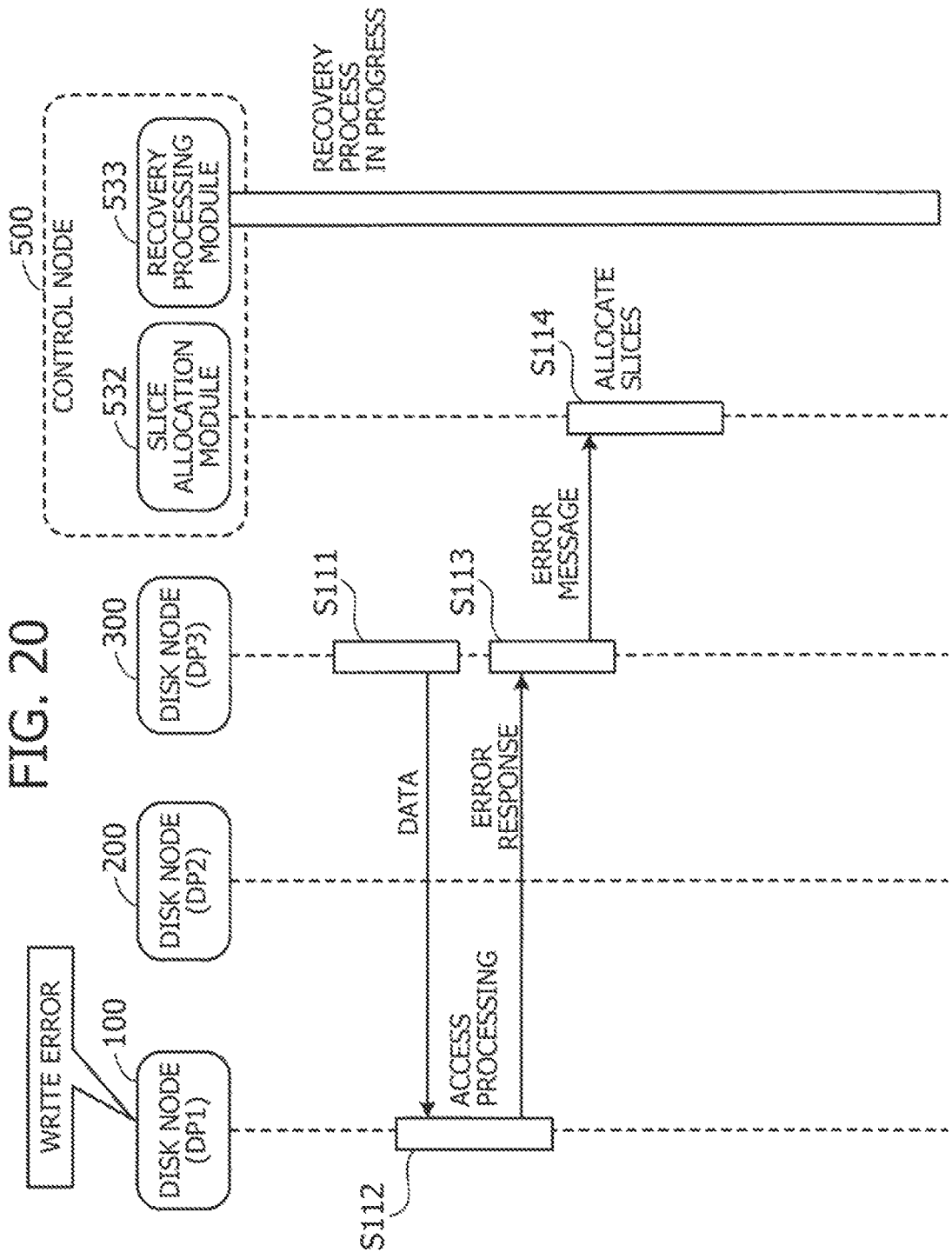
FIG. 20 is a sequence diagram illustrating how a slice copy operation is performed on a disk node with a write error.

FIG. 20 is a sequence diagram illustrating how a slice copy operation is performed on a disk node having a record of write error. Each step of FIG. 20 will now be described below in the order of step numbers.

(Step S111) In response to a slice copy request from the control node 500, the access processing module 320 in the source disk node 300 copies data of its own primary slice to a reserved slice specified as the copy destination. In the example of FIG. 20, the reserved slice is managed by a disk node 100.

(Step S112) In the destination disk node 100, the access processing module 120 interacts with the source disk node 300 to obtain data of a slice to be copied. During this course, the access processing module 120 checks the presence of a write error. If there is a write error, the access processing module 120 returns an error response to the source disk node 300. Details of how the disk node 100 handles data received for a slice copy operation will be described in detail later with reference to FIG. 21.

(Step S113) In response to the error response from the destination disk node 100, the access processing module 320 in the source disk node 300 sends an error message to the control node 500. This error message contains a slice ID indicating which slice has experienced an error in the slice copy operation and a disk ID indicating in which disk the slice is managed.

(Step S114) In the control node 500, the slice allocation module 532 executes a slice allocation process for the segment to which the slice has been assigned. The details of this process will be described later with reference to FIG. 23.

As can be seen from the above, the disk node 100 with a write error makes a slice copy operation fail with an error, which causes the control node 500 to initiate a slice allocation process.

Figure 21:
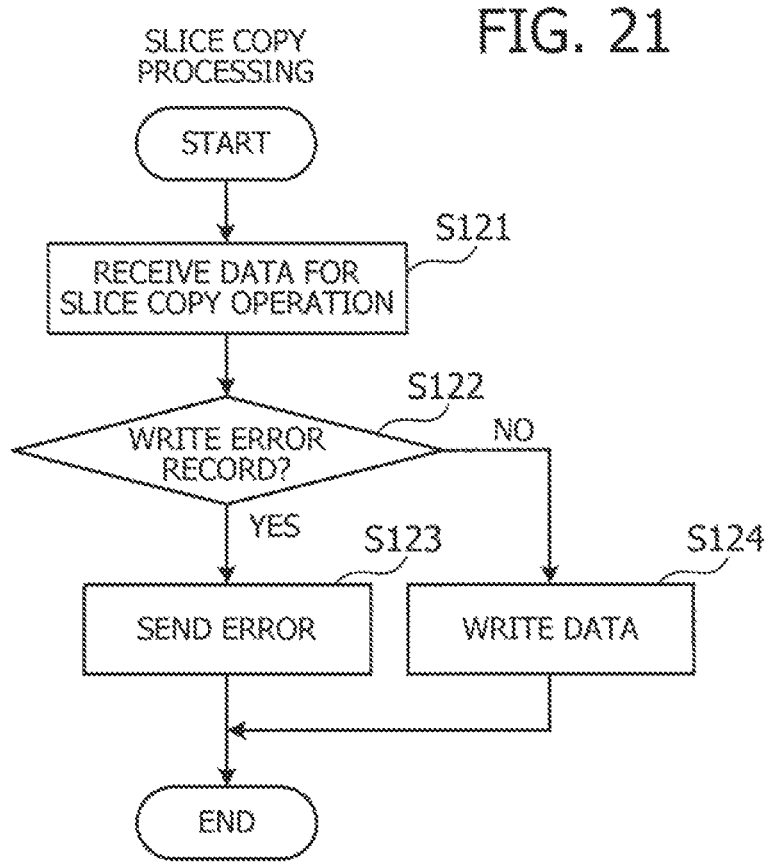
FIG. 21 is a flowchart illustrating an example of how a disk node handles slice copy data that is received.

FIG. 21 is a flowchart illustrating an example of how a disk node handles slice copy data that is received. Each step of FIG. 21 will now be described below in the order of step numbers.

(Step S121) The access processing module 120 in the disk node 100 receives data of a slice to be copied.

(Step S122) The access processing module 120 determines whether there is a record of write error. For example, the access processing module 120 consults the error record memory 140 to determine whether it has a write error. If there is a record of write error, the process advances to step S123. If no such records are found, the process advances to step S124.

(Step S123) The access processing module 120 sends an error to the source disk node of slice data. The process is then terminated.

(Step S124) The access processing module 120 writes received data in the destination slice in the storage device 110. The process is then terminated.

Figure 22:
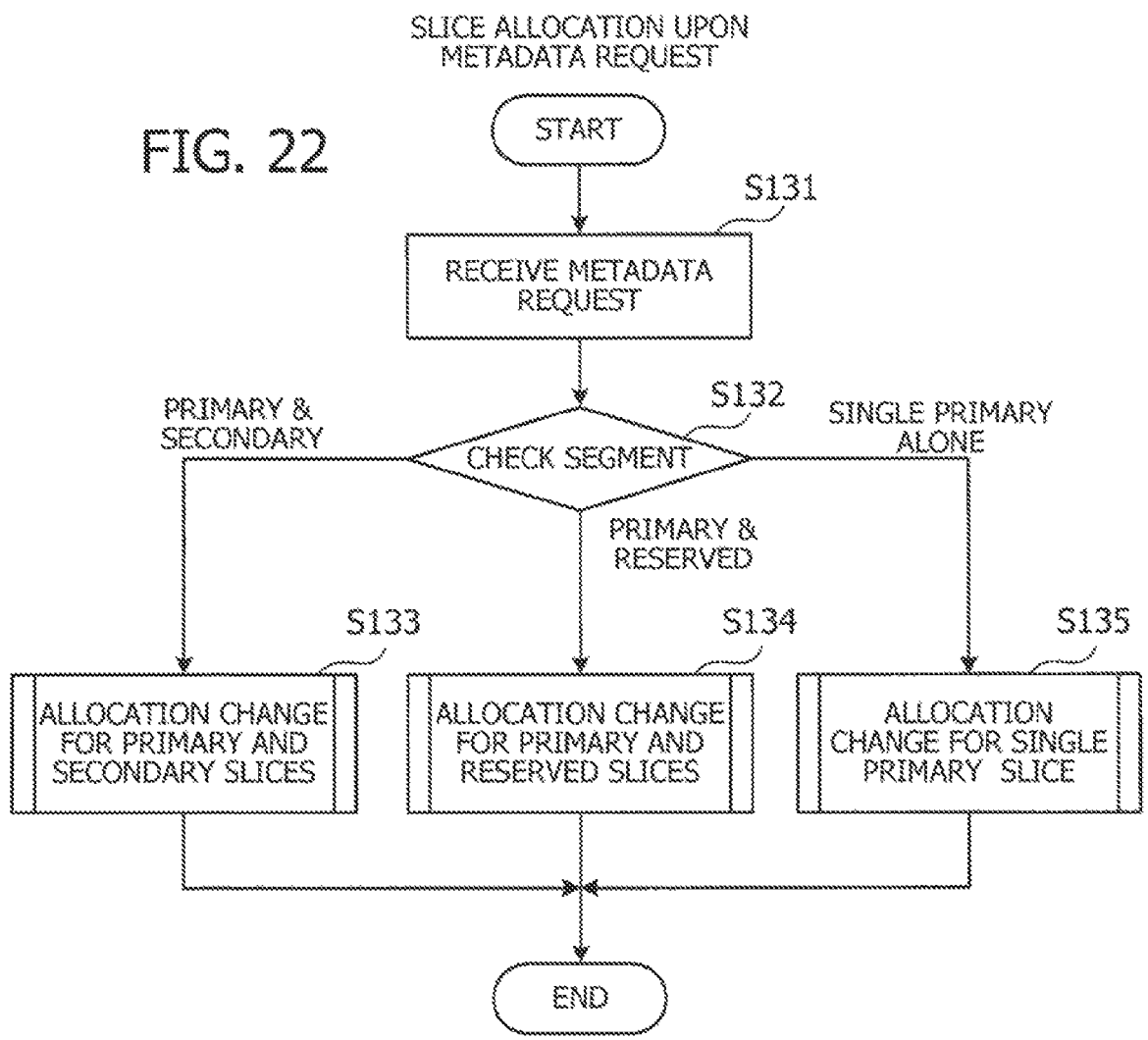
FIG. 22 is a flowchart illustrating an example of a slice allocation process executed when a metadata request is received.

The following section will describe a slice allocation process in detail. A slice allocation process may be invoked by two events; one is a metadata request, and the other is an error message produced as a result of a failed slice copy operation. FIG. 22 is a flowchart illustrating an example of a slice allocation process executed when a metadata request is received. Each step of FIG. 22 will now be described below in the order of step numbers.

(Step S131) The slice allocation module 532 in the control node 500 receives a metadata request from the access node 600.

(Step S132) The received metadata request specifies a segment whose slice allocation is to be changed. The slice allocation module 532 tests the slices currently allocated to the specified segment. For example, the slice allocation module 532 searches the logical disk metadata memory 540 to extract metadata records of slices currently allocated to the specified segment. The extracted metadata records indicate the status of the allocated slices in their status fields. If the segment is allocated a primary slice and a secondary slice, the process advances to step S133. If the segment is allocated a primary slice and a reserved slice, the process advances to step S134. If the segment is allocated a single primary slice alone, the process advances to step S135.

(Step S133) The slice allocation module 532 executes an allocation change for primary and secondary slices. The details of this process will be described later with reference to FIG. 24.

(Step S134) The slice allocation module 532 executes an allocation change for primary and reserved slices. The details of this process will be described later with reference to FIG. 26.

(Step S135) The slice allocation module 532 executes an allocation change for single primary slice. The details of this process will be described later with reference to FIG. 28.

Figure 23:
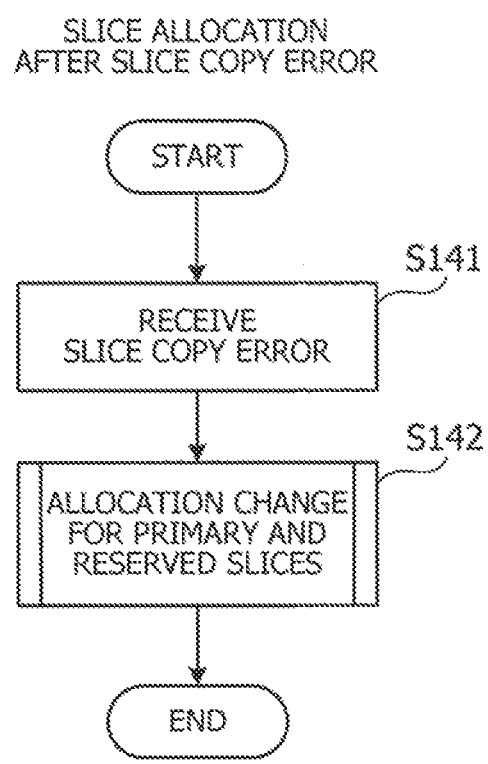
FIG. 23 is a flowchart illustrating an example of a slice allocation process executed when a slice copy error is encountered.

FIG. 23 is a flowchart illustrating an example of a slice allocation process executed when a slice copy error is encountered. Each step of FIG. 23 will now be described below in the order of step numbers.

(Step S141) The slice allocation module 532 in the control node 500 receives a message indicating a slice copy error from a disk node.

(Step S142) The slice allocation module 532 executes an allocation change for primary and reserved slices with respect to the segment that has undergone the failed slice copy process. The details of this step will be described later with reference to FIG. 26.

The following section will describe in detail the procedure of changing allocation of slices to a segment depending on the status of slices.

Figure 24:
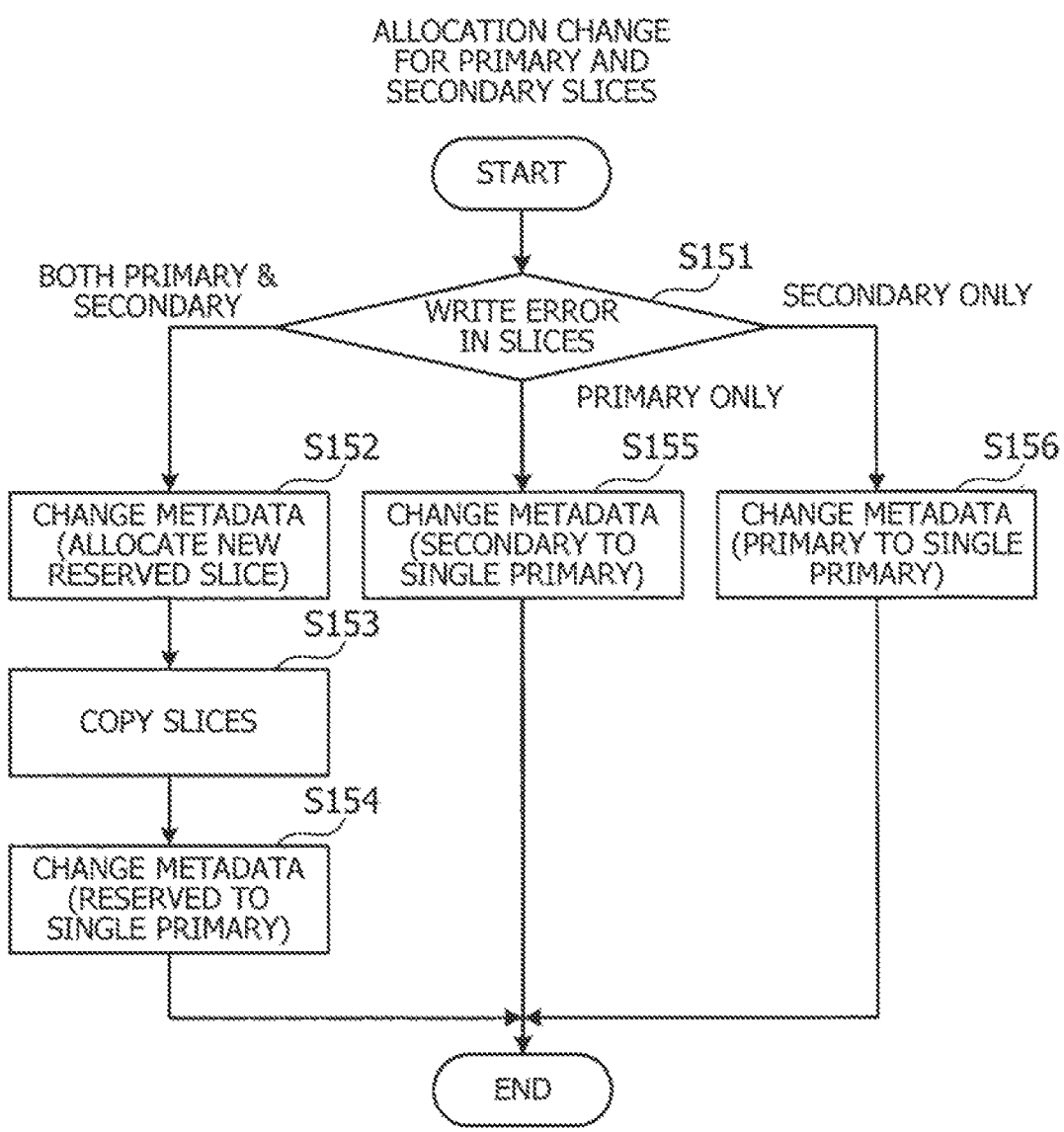
FIG. 24 is a flowchart illustrating an example of how the allocation is changed in the case where the segment is allocated primary and secondary slices.

FIG. 24 is a flowchart illustrating an example of how the allocation is changed in the case where the segment of interest is allocated both primary and secondary slices. Each step of FIG. 24 will now be described below in the order of step numbers.

(Step S151) The slices allocated to the segment of interest is managed by particular disk nodes. The slice allocation module 532 tests whether those managing disk nodes have encountered a write error. For example, the slice allocation module 532 looks into the disk node ID field of the metadata records extracted at step S132 to identify which disk nodes manage the allocated slices. The slice allocation module 532 then consults the error record memory 520 to determine whether each of those managing disk nodes has encountered a write error. When an error record is found in both managing disk nodes of primary and secondary slices, the process advances to step S152. When an error record is found only in the managing disk node of primary slice, the process advances to step S155. When an error record is found only in the managing disk node of secondary slice, the process advances to step S156.

(Step S152) The slice allocation module 532 changes metadata of the primary and secondary slices allocated to the segment of interest. Specifically, the slice allocation module 532 changes either the primary slice or secondary slice to a free slice, while newly allocating a reserved slice to the segment. A slice may be deallocated from the segment of interest if its managing disk node has a record of write error. More specifically, the slice allocation module 532 sends a metadata change request to the managing disk node of the secondary slice so as to change the slice to a free slice. Also, the slice allocation module 532 sends a metadata change request to a disk node managing a free slice to change the slice to a reserved slice. Upon receipt of a completion notice from each such disk node, the slice allocation module 532 updates relevant metadata records in its local logical disk metadata memory 540 in the same way as the above managing disk nodes have changed their slices. It is assumed in the second embodiment that it is a secondary slice that is changed to a free slice. To allocate a new reserve slice, the slice allocation module 532 first consults the error record memory 520 to determine whether any disk node has a record of write error. The slice allocation module 532 then finds a healthy disk node and selects a slice for reservation from among the slices managed by the found disk node.

(Step S153) The slice allocation module 532 commands the managing disk node of primary slice to duplicate data from primary slice to reserved slice.

(Step S154) The slice allocation module 532 changes metadata relevant to the primary and reserved slices allocated to the segment of interest. Specifically, the slice allocation module 532 changes the primary slice to a free slice, and the reserved slice to a single primary slice. More specifically, the slice allocation module 532 sends a metadata change request to the managing disk node of the primary slice so as to change the slice to a free slice. The slice allocation module 532 also sends a metadata change request to the managing disk node of the reserved slice to change the slice to a single primary slice. Upon receipt of a completion notice from each such disk node, the slice allocation module 532 updates relevant metadata records in its local logical disk metadata memory 540 in the same way as the above managing disk nodes have changed their slices. The process is then terminated.

(Step S155) The slice allocation module 532 changes metadata of the primary and secondary slices allocated to the segment of interest. Specifically, the slice allocation module 532 changes primary slice to free slice and secondary slice to single primary slice. More specifically, the slice allocation module 532 sends a metadata change request to the managing disk node of the primary slice so as to change the slice to a free slice. The slice allocation module 532 also sends a metadata change request to the managing disk node of the secondary slice to change the slice to a single primary slice. Upon receipt of a completion notice from each such disk node, the slice allocation module 532 updates relevant metadata records in its local logical disk metadata memory 540 in the same way as the above managing disk nodes have changed their slices. The process is then terminated.

(Step S156) The slice allocation module 532 changes metadata of the primary and secondary slices allocated to the segment of interest. Specifically, the slice allocation module 532 changes the primary slice to a single primary slice and the secondary slice to a free slice. More specifically, the slice allocation module 532 sends a metadata change request to the managing disk node of the primary slice so as to change the slice to a single primary slice. The slice allocation module 532 also sends a metadata change request to the managing disk node of the secondary slice so as to change the slice to a free slice. Upon receipt of a completion notice from each such disk node, the slice allocation module 532 updates relevant metadata records in its local logical disk metadata memory 540 in the same way as the above managing disk nodes have changed their slices. The process is then terminated.

FIG. 25 illustrates an example of how the allocation is changed in the case where the segment is allocated primary and secondary slices. It is assumed in the example of FIG. 25 that the primary and secondary slices of the segment of interest are respectively managed by disk nodes 100 (DP1) and 200 (DP2). It is also assumed that another disk node 300 (DP3) has no write errors. The example of allocation changing in FIG. 25 focuses on the primary slice in the disk node 100, secondary slice in the disk node 200, and free slice in the disk node 300.

Referring to FIG. 25, every disk node has no write errors in the initial state. Metadata of slices allocated to the segment of interest is changed in different ways, depending on which of their managing disk nodes 100 and 200 encounters a write error, as will be described below.

In the case of "YES, YES" where both the disk nodes 100 and 200 have a record of write error, each disk node 100, 200, and 300 operates as follows. The primary slice (status flag "P") managed in the disk node 100 is not changed in the first stage of metadata change, but used as a source of data to be copied in the subsequent slice copy operation. When the slice data is copied, the primary slice in the disk node 100 is changed to a free slice (status flag "F"). The secondary slice (status flag "S") managed in the disk node 200 is changed to a free slice (status flag "F") in the first stage of metadata change. The free slice (status flag "F") managed in the disk node 300 is changed to a reserved slice (status flag "R") in the first stage of metadata change and specified as the destination of data in the subsequent slice copy operation. When the slice data is copied, the reserved slice in the disk node 300 is changed to a single primary slice (status flag "SP").

In the case of "YES, NO" where only one disk node 100 has a record of write error, each disk node 100, 200, and 300 operates as follows. The primary slice (status flag "P") managed in the disk node 100 is changed to a free slice (status flag "F"). The secondary slice (status flag "S") managed in the disk node 200 is changed to a single primary slice (status flag "SP"). No changes are made in the free slice (status flag "F") managed in the disk node 300.

In the case of "NO, YES" where only one disk node 200 has a record of write error, each disk node 100, 200, and 300 operates as follows. The primary slice (status flag "P") managed in the disk node 100 is changed to a single primary slice (status flag "SP"). The secondary slice (status flag "S") managed in the disk node 200 is changed to a free slice (status flag "F"). No changes are made in the free slice (status flag "F") managed in the disk node 300.

Figure 26:
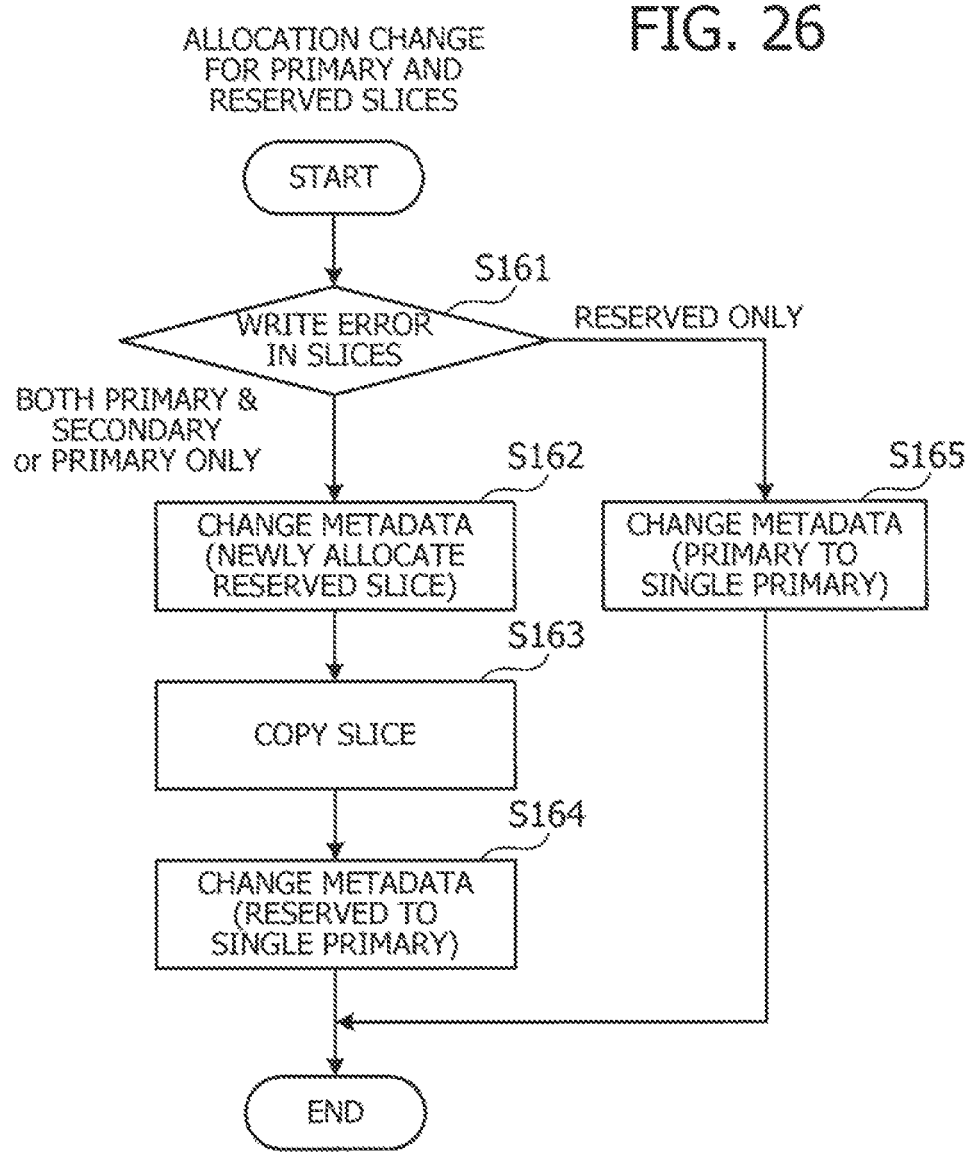
FIG. 26 is a flowchart illustrating an example of how the allocation is changed in the case where the segment is allocated primary and reserved slices.

FIG. 26 is a flowchart illustrating an example of how the allocation is changed in the case where the segment is allocated primary and reserved slices. Each step of FIG. 26 will now be described below in the order of step numbers.

(Step S161) The slices allocated to the segment of interest is managed by particular disk nodes. The slice allocation module 532 tests whether those managing disk nodes have encountered a write error. When an error record is found in both managing disk nodes of primary and secondary slices, or only in the managing disk node of primary slice, the process advances to step S162. When an error record is found only in the managing disk node of reserved slice, the process advances to step S165.

(Step S162) The slice allocation module 532 changes metadata relevant to the primary and reserved slices allocated to the segment of interest. Specifically, the slice allocation module 532 changes the reserved slice to a free slice, while newly allocating a reserved slice to the segment. More specifically, the slice allocation module 532 sends a metadata change request to the managing disk node of the reserved slice so as to change the slice to a free slice. The slice allocation module 532 also sends a metadata change request to a disk node managing a free slice so as to change the slice to a reserved slice. Upon receipt of a completion notice from each such disk node, the slice allocation module 532 updates relevant metadata records in its local logical disk metadata memory 540 in the same way as the above managing disk nodes have changed their slices.

(Step S163) The slice allocation module 532 commands the managing disk node of the primary slice to duplicate data from primary slice to reserved slice.

(Step S164) The slice allocation module 532 changes metadata relevant to the primary and reserved slices allocated to the segment of interest. Specifically, the slice allocation module 532 changes the primary slice to a free slice, and the reserved slice to a single primary slice. More specifically, the slice allocation module 532 sends a metadata change request to the managing disk node of the primary slice so as to change the slice to a free slice. The slice allocation module 532 also sends a metadata change request to the managing disk node of the reserved slice to change the slice to a single primary slice. Upon receipt of a completion notice from each such disk node, the slice allocation module 532 updates relevant metadata records in its local logical disk metadata memory 540 in the same way as the above managing disk nodes have changed their slices. The process is then terminated.

(Step S165) The slice allocation module 532 changes metadata relevant to the primary and reserved slices allocated to the segment of interest. Specifically, the slice allocation module 532 changes the primary slice to a single primary slice and the reserved slice to a free slice. More specifically, the slice allocation module 532 sends a metadata change request to the managing disk node of the primary slice so as to change the slice to a single primary slice. The slice allocation module 532 also sends a metadata change request to the managing disk node of the reserved slice so as to change the slice to a free slice. Upon receipt of a completion notice from each such disk node, the slice allocation module 532 updates relevant metadata records in its local logical disk metadata memory 540 in the same way as the above managing disk nodes have changed their slices. The process is then terminated.

FIG. 27 illustrates an example of how the allocation is changed in the case where the segment is allocated primary and reserved slices. It is assumed in the example of FIG. 27 that the primary and reserved slices of the segment of interest are respectively managed by disk nodes 100 (DP1) and 200 (DP2). It is also assumed that another disk node 300 (DP3) has no write errors. The example of allocation changing in FIG. 27 focuses on the primary slice in the disk node 100, reserved slice in the disk node 200, and free slice in the disk node 300.

Referring to FIG. 27, every disk node has no write errors in the initial state. Metadata of slices allocated to the segment of interest is changed in different ways, depending on which of their managing disk nodes 100 and 200 encounters a write error, as will be described below.

In the case of "YES, YES" where both the disk nodes 100 and 200 have a record of write error, each disk node 100, 200, and 300 operates as follows. The primary slice managed in the disk node 100 is not changed, but used as a source of data to be copied in the subsequent slice copy operation. When the slice data is copied, the primary slice in the disk node 100 is changed to a free slice (status flag "F"). The reserved slice (status flag "R") managed in the disk node 200 is changed to a free slice (status flag "F") in the first stage of metadata change. The free slice (status flag "F") managed in the disk node 300 is changed to a reserved slice (status flag "R") in the first stage of metadata change and specified as the destination of data in the subsequent slice copy operation. When the slice data is copied, the reserved slice in the disk node 300 is changed to a single primary slice (status flag "SP").

In the case of "YES, NO" where only the disk node 100 has a record of write error, the slices are changed in the same way as in the case where both the disk nodes 100 and 200 have. In this case, however, the reserved slice in the disk node 200 may be specified as the destination of slice data to be copied, without changing its current status, since there is no write error in the disk node 200.

In the case of "NO, YES" where only one disk node 200 has a record of write error, each disk node 100, 200, and 300 operates as follows. The primary slice (status flag "P") managed in the disk node 100 is changed to a single primary slice (status flag "SP"). The reserved slice (status flag "R") managed in the disk node 200 is changed to a free slice (status flag "F"). No changes are made in the free slice (status flag "F") managed in the disk node 300.

Figure 28:
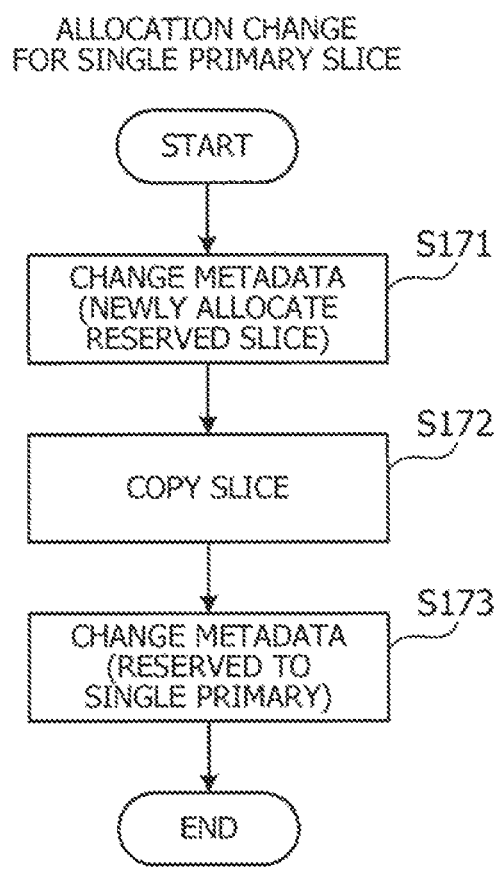
FIG. 28 is a flowchart illustrating an example of how the allocation is changed in the case where the segment is allocated a single primary slice.

FIG. 28 is a flowchart illustrating an example of how the allocation is changed in the case where the segment is allocated a single primary slice. Each step of FIG. 28 will now be described below in the order of step numbers.

(Step S171) The slice allocation module 532 changes metadata relevant to the primary slice allocated to the segment of interest. Specifically, the slice allocation module 532 changes the single primary slice to a primary slice, while newly allocating a reserved slice to the segment. More specifically, the slice allocation module 532 sends a metadata change request to the managing disk node of the single primary slice so as to change the slice to a primary slice. The slice allocation module 532 also sends a metadata change request to a disk node managing a free slice to change the slice to a reserved slice. Upon receipt of a completion notice from each such disk node, the slice allocation module 532 updates relevant metadata records in its local logical disk metadata memory 540 in the same way as the above managing disk nodes have changed their slices.

(Step S172) The slice allocation module 532 commands the managing disk node of the primary slice to duplicate data from primary slice to reserved slice.

(Step S173) The slice allocation module 532 changes metadata relevant to the primary and reserved slices allocated to the segment of interest. Specifically, the slice allocation module 532 changes the primary slice to a free slice, and the reserved slice to a single primary slice. More specifically, the slice allocation module 532 sends a metadata change request to the managing disk node of the primary slice so as to change the slice to a free slice. The slice allocation module 532 also sends a metadata change request to the managing disk node of the reserved slice to change the slice to a single primary slice. Upon receipt of a completion notice from each such disk node, the slice allocation module 532 updates relevant metadata records in its local logical disk metadata memory 540 in the same way as the above managing disk nodes have changed their slices. The process is then terminated.

FIG. 29 illustrates an example of how the allocation is changed in the case where the segment is allocated a single primary slice. It is assumed in the example of FIG. 29 that the primary slice of the segment of interest is managed by disk node 100 (DP1). It is also assumed that another disk node 200 (DP2) has no write errors. The example of allocation changes in FIG. 29 focuses on the single primary slice in the disk node 100 and free slice in the disk node 200.

Referring to FIG. 29, both disk nodes have no write errors in the initial state. As the segment of interest is only allocated a single primary slice, it is only when its managing disk node 100 encounters a write error that a metadata change is necessitated in the segment. In this case, metadata of slices is changed in each disk node 100 and 200 as follows. The single primary slice (status flag "SP") managed in the disk node 100 is changed to a primary slice in the first stage of metadata change and specified as the source of data in the subsequent slice copy operation. When the slice data is copied, the primary slice in the disk node 100 is changed to a free slice (status flag "F"). In the disk node 200, on the other hand, a free slice (status flag "F") is changed to a reserved slice (status flag "R") in the first stage of metadata change and specified as the destination of data in the subsequent slice copy operation. When the slice data is copied, the reserved slice in the disk node 200 is changed to a single primary slice (status flag "SP").

The above-described process changes allocation of slices and modifies their metadata accordingly, so that the segment of interest is allocated a slice managed in a normal disk node. The newly allocated slice serves as a single primary slice for the segment.

The next section will describe how the control node 500 and disk nodes work together in a slice allocation process including a slice copy operation. It is noted that a slice copy operation is necessitated when the segment data would be lost by deallocation of slices due to a write error in their disk node. A typical case will be discussed in the following example, where the segment of interest suffers a write error in both the managing disk nodes of primary slice and secondary slice.

Figure 30:
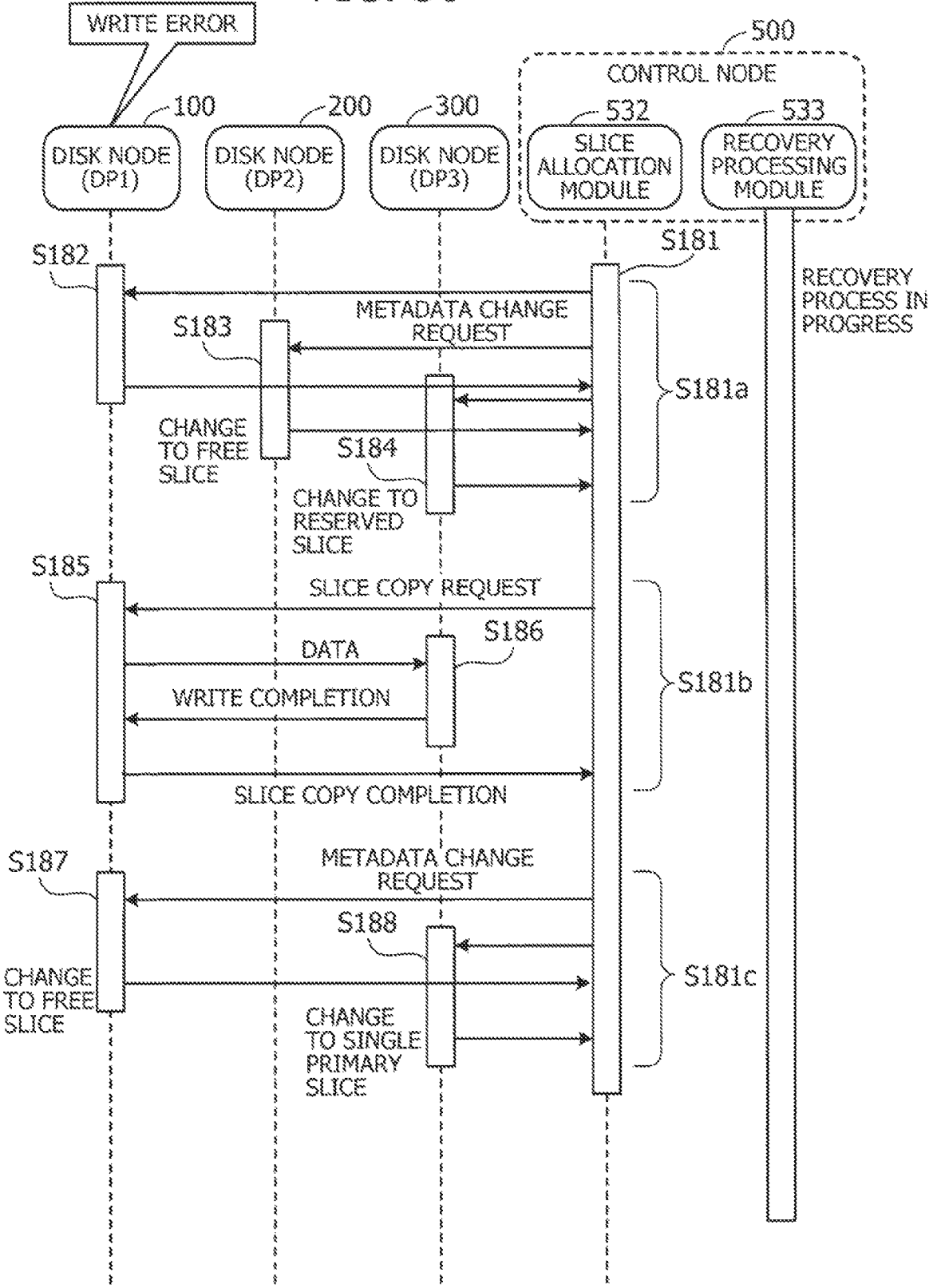
FIG. 30 is a sequence diagram illustrating an example of a slice allocation process including a slice copy operation.

FIG. 30 is a sequence diagram illustrating an example of a slice allocation process including a slice copy operation. This procedure is invoked when, for example, the process illustrated in FIG. 24 moves from step S151 to step S152. Each step of FIG. 30 will now be described below in the order of step numbers.

(Step S181) This slice allocation process including a slice copy operation is actually formed from the following three parts: allocating a reserved slice (step S181a), copying slice data (step S181b), and unpairing the primary slice (step S181c).

(Step S181a) The slice allocation module 532 sends a metadata change request to each disk node 100, 200, and 300. For example, the disk node 100 is to receive a metadata change request for deletion of metadata of secondary slice, i.e., the slice paired with primary slice of the segment of interest. The disk node 200 is to receive a metadata change request for deallocating the secondary slice from the segment of interest, so as to make it a free slice. The disk node 300 is to receive a metadata change request for allocating a free slice to the segment of interest as its reserved slice.

(Step S182) In the disk node 100, the metadata management module 160 changes relevant metadata records in the metadata memory 150 and storage device 110 in accordance with the received metadata change request. The metadata management module 160 then returns a response message to the control node 500 to indicate that the metadata change is completed.

(Step S183) In the disk node 200, the metadata management module 260 changes relevant metadata records in the metadata memory and storage device 210 in accordance with the received metadata change request. The metadata management module 260 then returns a response message to the control node 500 to indicate that the metadata change is completed.

(Step S184) In the disk node 300, the metadata management module 360 changes relevant metadata records in the metadata memory and storage device 310 in accordance with the received metadata change request. The metadata management module 360 then returns a response message to the control node 500 to indicate that the metadata change is completed.

When the metadata change at steps S182 to S184 is finished, the recovery processing module 533 updates its own metadata in the logical disk metadata memory 540 in the same way as done in the disk nodes 100, 200, and 300.

(Step S181b) Upon receipt of a response indicating completion of the metadata change from the disk nodes 100, 200, and 300, the slice allocation module 532 sends a slice copy request to the managing disk node 100 of primary slice. This slice copy request contains a specific slice ID to designate the primary slice of the segment of interest, a disk node ID to designate which disk node manages the reserved slice, and another slice ID to designate the reserved slice.

(Step S185) In the disk node 100, the access processing module 120 receives the slice copy request, which specifies a source slice of data and a destination slice to be paired with the specified source slice. Upon receipt, the access processing module 120 sends data of the specified source slice to the disk node 300 that manages the destination slice. The slice ID of the destination slice is sent together with this data to specify which slice is to store the data.

(Step S186) In the destination disk node 300, the access processing module 320 receives data from the source disk node 100 and stores it in the specified destination slice. When the received data is stored, the access processing module 320 returns a write completion notice to the source disk node 100. This write completion notice causes the access processing module 120 in the source disk node 100 to send a response back to the control node 500 to indicate completion of the slice copy operation.

(Step S181c) Now that the disk node 100 indicates completion of the slice copy operation, the slice allocation module 532 in the disk node 100 sends a metadata change request to the disk node 100 so as to change the primary slice to a free slice. This metadata change request contains, for example, a specific slice ID to designate the primary slice that is currently allocated to the segment of interest.

Similarly, with the response from the disk node 100 indicating completion of slice copy, the recovery processing module 533 sends a metadata change request to the disk node 300 so as to change the reserved slice to a single primary slice. This metadata change request contains, for example, a specific slice ID to designate the reserved slice that is currently allocated to the segment of interest.

(Step S187) In the disk node 100, the metadata management module 160 changes relevant metadata records in the metadata memory 150 and storage device 110 so that the primary slice is changed to a free slice in accordance with the received metadata change request. The metadata management module 160 then returns a response message to the control node 500 to indicate that the metadata change is completed.

(Step S188) In the disk node 300, the metadata management module 360 changes relevant metadata records in the metadata memory and storage device 310 so that the reserved slice is changed to a single primary slice in accordance with the received metadata change request. Upon completion of the metadata change, the metadata management module 360 sends a response back to the control node 500 to indicate the completion. When the metadata change at steps S187 and S188 is finished, the slice allocation module 532 updates its own metadata in the logical disk metadata memory 540 in the same way as done in the disk nodes 100, 200, and 300.

The above-described procedure establishes allocation of slices through a slice copy operation. The slice allocation procedure may, however, not always involve slice copy operations. The following section will now describe how the control node 500 and disk nodes work together to achieve such a procedure.

Figure 31:
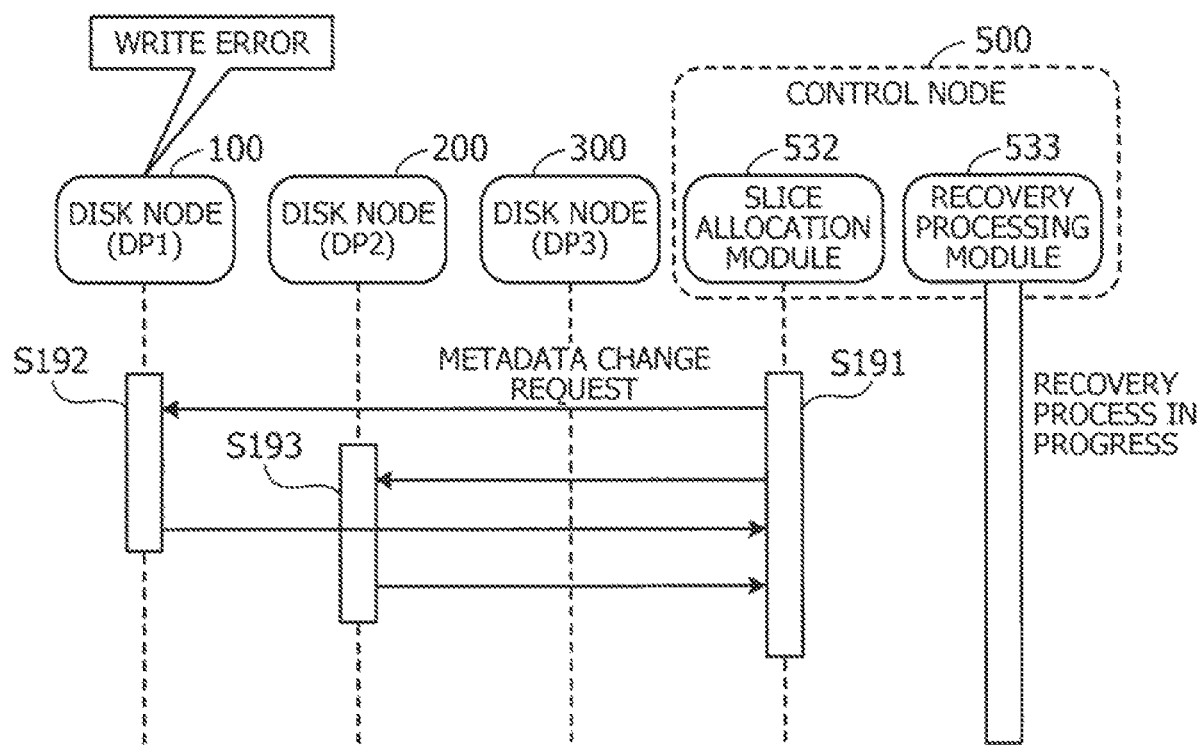
FIG. 31 is a sequence diagram illustrating an example of a slice allocation process with no slice copy operation.

FIG. 31 is a sequence diagram illustrating an example of a slice allocation process with no slice copy operation. This procedure is invoked when, for example, the process illustrated in FIG. 24 moves from step S151 to step S153. Each step of FIG. 31 will be described below in the order of step numbers.

(Step S191) The slice allocation module 532 sends a metadata change request to each disk node 100 and 200. For example, the disk node 100 is to receive a metadata change request for deallocating the primary slice from the segment of interest, so as to make it a free slice. The disk node 200 is to receive a metadata change request for changing the secondary slice of the segment of interest to a single primary slice.

(Step S192) In the disk node 100, the metadata management module 160 changes relevant metadata records in the metadata memory 150 and storage device 110 in accordance with the received metadata change request and returns a response message to the control node 500 to indicate completion of the requested change.

(Step S193) In the disk node 200, the metadata management module 260 changes relevant metadata records in the metadata memory and storage device 210 in accordance with the received metadata change request and returns a response message to the control node 500 to indicate completion of the requested change. When the metadata change at steps S191 and S192 is finished, the slice allocation module 532 updates its own metadata in the logical disk metadata memory 540 in the same way as done in the disk nodes 100 and 200.

As can be seen from the above explanation, when a disk node experiences a write error while there is a recovery process in progress, the disk node records the fact in its memory, so does the control node. In the case where that faulty disk node receives access to a slice while a recovery process is in progress, it is determined whether the data of a segment corresponding to the slice would be lost if the slice was deallocated from the segment. When it is found that the data would be lost, the deallocation of the slice will not be executed until the slice data is copied. This feature of the embodiment prevents the data from being lost.

If it is found that the data would not be lost by deallocation, it means that there exists another slice containing the same data as part of the redundant pair. That slice is changed to a single primary slice, thus subjecting the slice to the ongoing recovery process. Accordingly, the recovery process attends to the accessed slice in preference to other slices managed by the same disk node that has encountered a write error.

As a result of access to a slice in the faulty disk node, the accessed slice is deallocated from its corresponding segment. The segment thus becomes an impaired segment, to which a single primary slice is assigned. The recovery process, on the other hand, selects single primary slices one by one and restores redundancy of the selected slice, as illustrated in FIG. 16. Accordingly, the newly impaired segment will regain its redundancy-protected state through the recovery process, thus maintaining the reliability of the multi-node storage system.

According to the second embodiment, the slices deallocated due to a write error in a disk node are changed to free slices (status flag "F"). Because of the write error in their managing disk node, those free slices will never be selected as reserved slices, i.e., as the destination of data in slice copy operations, whether in a recovery process or in a slice allocation process. In addition, the deallocated slices will no longer be accessed by the access node 600 because the slice allocation process is followed by transmission of updated metadata to the access node 600 (see FIG. 17). After all, the multi-node storage system removes those deallocated slices from any access, thus disengaging them from the system while allowing the access node 600 to make access to a copy of the same slice data. As a variation of the second embodiment, the slices deallocated due to a write error in a disk node may be changed to abnormal slices (status flag "B").

The above-described second embodiment assumes that each disk node is connected to one storage device. Accordingly, the system disconnects a disk node when its associated storage device is failed. The second embodiment may, however, be modified such that two or more storage devices are connected to one disk node. In this case, the system may be configured to disconnect storage devices individually.

Further, the disk nodes may be configured to accept access requests from the access node 600 and execute a read operation on a specified storage device even in the case where the disk nodes have encountered a write error. In the foregoing second embodiment, a disk node with a write error responds to a slice copy request from the control node 500 by reading slice data from its attached storage device and sending the read data to the destination node for copying. The disk node, on the other hand, returns an error response to the access node 600 even when its access request is for a read operation. In this way, the proposed system turns the accessed segment into an impaired segment for the purpose of quick restoration of data redundancy through a recovery process. However, the presence of a write error does not always mean that the stored data cannot be read. Accordingly, the system may be configured in a different way to give priority to faster data response to the access node 600. That is, the disk node with a write error may execute a read request from the access node 600 while negating other access requests and send the read data to the access node 600. The access node 600 can therefore obtain desired data without the need for waiting completion of a slice allocation process.

Other Implementations

The above-described processing functions may be implemented on a computer system. To achieve this implementation, the instructions describing the functions of a data allocation controller 1, control node 500, disk nodes 100, 200, 300, and 400 are encoded and provided in the form of computer programs. A computer system executes those programs to provide the processing functions discussed in the preceding sections. The programs may be encoded in a computer-readable, non-transitory medium for the purpose of storage and distribution. Such computer-readable media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, are used for distribution of program products. Network-based distribution of software programs may also be possible, in which case several master program files are made available on a server computer for downloading to other computers via a network.

A computer stores necessary software components in its local storage unit, which have previously been installed from a portable storage media or downloaded from a server computer. The computer executes programs read out of the local storage unit, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

The processing functions discussed in the preceding sections may also be implemented wholly or partly by using a digital signal processor (DSP), application-specific integrated circuit (ASIC), programmable logic device (PLD), or other electronic circuit.

CONCLUSION

Two embodiments and their variations have been discussed above. The proposed techniques prevent data in a storage device from being lost even in the case where the storage device encounters a write error when a redundancy restoration process is in progress.

The above sections have exemplified several embodiments and their variations. The described components may be replaced with other components having equivalent functions or may include other components or processing operations. Where appropriate, two or more components and features provided in the embodiments may be combined in a different way.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A computer-readable, non-transitory medium storing a data allocation control program for controlling data allocation in a plurality of disk nodes that manage data in storage devices connected thereto, the data allocation control program, when executed by a computer, causing the computer to perform a procedure, the procedure comprising:
    executing a redundancy restoration procedure by commanding a first disk node that manages redundancy-lost data to create a new copy of the redundancy-lost data, the redundancy-lost data being data stored in a first storage device and lacking a copy thereof;
    recording, upon receipt of a write error message indicating a write error encountered by a second storage device during the redundancy restoration procedure, an identifier of the second storage device in an error record memory; and
    identifying the second storage device by consulting the error record memory, selecting data stored in the second storage device as copy target data, and commanding a second disk node managing the second storage device to create a copy of the copy target data in a third storage device having no write error when the third storage device is found to have no such copy of the copy target data.

2. The computer-readable, non-transitory medium according to claim 1, wherein the redundancy restoration procedure comprises selecting each piece of redundancy-lost data one by one, and commanding the first disk node managing the selected piece of redundancy-lost data to create a new copy thereof in a fourth storage device that is different from the first storage device containing the selected piece of redundancy-lost data and has no write error.

3. The computer-readable, non-transitory medium according to claim 1, wherein:
    the redundancy restoration procedure comprises investigating the plurality of storage devices to find the redundancy-lost data therein, storing management data in a management data memory to indicate storage locations of the found redundancy-lost data, sequentially selecting each piece of redundancy-lost data indicated by the management data in the management data memory, and commanding the first disk node managing the selected piece of redundancy-lost data to create a new copy thereof; and
    the commanding the second disk node comprises storing additional management data in the management data memory, upon completion of copying the copy target data, the additional management data describing the resulting copy of the copy target data as being redundancy-lost data.

4. The computer-readable, non-transitory medium according to claim 3, wherein the redundancy restoration procedure further comprises:
    searching, upon completion of copying every piece of redundancy-lost data indicated by the management data in the management data memory, the error record memory to determine whether any storage device has encountered a write error;
    adding management data in the management data memory for redundancy-lost data that is to be produced as a result of disabling access to the second storage device; and
    continuing to restore data redundancy based on the added management data.

5. The computer-readable, non-transitory medium according to claim 1, wherein the procedure further comprises:
    selecting, upon receipt of a data access error message from a device which indicates that the device has encountered a write error in an attempt to access data in the second storage device, the accessed data in the second storage device as copy target data;
    producing, when a copy of the selected copy target data is created as a result of the commanding the second disk node, management data to indicate the copy of the selected copy target data as a new destination of access; and
    sending the management data back to the device from which the data access error message has been received.

6. The computer-readable, non-transitory medium according to claim 1, wherein the procedure further comprises initiating the redundancy restoration procedure for redundancy-lost data that is to be produced as a result of disabling access to a fourth storage device, in response to a write error message indicating a write error in the fourth storage device during a period when there is no ongoing redundancy restoration procedure.

7. A method executed by a computer to control data allocation in a plurality of disk nodes that manage data in storage devices connected thereto, the method comprising:
    executing a redundancy restoration procedure by commanding a first disk node that manages redundancy-lost data to create a new copy of the redundancy-lost data, the redundancy-lost data being data stored in a first storage device and lacking a copy thereof;
    recording, upon receipt of a write error message indicating a write error encountered by a second storage device during the redundancy restoration procedure, an identifier of the second storage device in an error record memory; and
    identifying the second storage device by consulting the error record memory, selecting data stored in the second storage device as copy target data, and commanding a second disk node managing the second storage device to create a copy of the copy target data in a third storage device having no write error when the third storage device is found to have no such copy of the copy target data.

8. An apparatus which controls allocation of data in a plurality of disk nodes that manage data in storage devices connected thereto, the apparatus comprising:
    a redundancy restoration module which executes a redundancy restoration procedure by commanding a first disk node that manages redundancy-lost data to create a new copy of the redundancy-lost data, the redundancy-lost data being data stored in a first storage device and lacking a copy thereof;
    an error message reception module which records, upon receipt of a write error message indicating a write error encountered by a second storage device during the redundancy restoration procedure, an identifier of the second storage device in an error record memory; and
    a copy command module which identifies the second storage device by consulting the error record memory, selects data stored in the second storage device as copy target data, and commands a second disk node managing the second storage device to create a copy of the copy target data in a third storage device having no write error when the third storage device is found to have no such copy of the copy target data.

9. An apparatus which controls allocation of data in a plurality of disk nodes that manage data in storage devices connected thereto, the apparatus comprising:
- a processor configured to execute a procedure, the procedure comprising:
    - executing a redundancy restoration procedure by commanding a first disk node that manages redundancy-lost data to create a new copy of the redundancy-lost data, the redundancy-lost data being data stored in a first storage device and lacking a copy thereof;
    - recording, upon receipt of a write error message indicating a write error encountered by a second storage device during the redundancy restoration procedure, an identifier of the second storage device in an error record memory; and
    - identifying the second storage device by consulting the error record memory, selects data stored in the second storage device as copy target data, and commands a second disk node managing the second storage device to create a copy of the copy target data in a third storage device having no write error when the third storage device is found to have no such copy of the copy target data.

* * * * *